United States Patent
Oberle

(10) Patent No.: US 12,494,937 B2
(45) Date of Patent: Dec. 9, 2025

(54) BUILT-IN CLOUD ANALYTICS SUPPORT FOR SMART HOME

(71) Applicant: SAP SE, Walldorf (DE)

(72) Inventor: Daniel Oberle, Durmersheim (DE)

(73) Assignee: SAP SE, Walldorf (DE)

( * ) Notice: Subject to any disclaimer, the term of this patent is extended or adjusted under 35 U.S.C. 154(b) by 446 days.

(21) Appl. No.: 17/974,102

(22) Filed: Oct. 26, 2022

(65) Prior Publication Data

US 2024/0146570 A1   May 2, 2024

(51) Int. Cl.
*H04L 12/28* (2006.01)

(52) U.S. Cl.
CPC ........ *H04L 12/282* (2013.01); *H04L 12/2834* (2013.01)

(58) Field of Classification Search
CPC .......................... H04L 12/282; H04L 12/2834
See application file for complete search history.

(56) References Cited

U.S. PATENT DOCUMENTS

| | | | |
|---|---|---|---|
| 2016/0148099 A1* | 5/2016 | Micali | G06N 20/00 706/11 |
| 2017/0005982 A1* | 1/2017 | Gould | G06Q 50/01 |
| 2018/0115788 A1* | 4/2018 | Burns | G06V 20/52 |
| 2018/0234266 A1* | 8/2018 | Rudolph | H04L 67/12 |

* cited by examiner

*Primary Examiner* — Charles R Kasenge
(74) *Attorney, Agent, or Firm* — Buckley, Maschoff & Talwalkar LLC

(57) ABSTRACT

A smart home hub may receive sensor information from a plurality of smart home objects (e.g., a washing machine, an electricity meter, etc.). The smart home hub may also generate smart home events based on the received sensor information. The sensor information may be received via a plurality of different communication protocols. An analytics cloud platform with built-in smart home support may receive smart home information from the smart home hub via an analytic querying protocol adapted to handle big data. The analytics cloud platform may process the received smart home information using a multi-platform query library and automatically analyze the processed data using predictive analytics. The analytics cloud platform may then arrange to display analysis results via an analytics cloud user interface.

21 Claims, 27 Drawing Sheets

BUILT-IN CLOUD ANALYTICS SUPPORT FOR SMART HOME

BACKGROUND

A "smart home" may contain a number of smart objects or devices. For example, the smart objects might include a sensor (e.g., a thermostat or video camera) that is able to gather and transmit information about the home, such as via an Internet of Things ("IoT") communication network. The transmitted information may then be processed by functions to control operation of the smart home. For example, a thermostat might be automatically set to a lower temperature when the function determines that nobody is currently in the home. Manually implementing such functions, however, can be a time consuming and error-prone task—especially when a substantial number of smart objects or applications are involved. Moreover, implementing smart home analytics, such as in an analytics cloud, to analyze smart home data can be a difficult task with existing user interfaces. It would therefore be desirable to perform smart home event processing and analysis in a secure and efficient manner.

SUMMARY

Methods and systems may facilitate smart home analysis. A smart home hub may receive sensor information from a plurality of smart home objects (e.g., a washing machine, an electricity meter, etc.). The smart home hub may also generate smart home events based on the received sensor information. A central management plane component associated with a cloud-native application runtime may communicate with the smart home hub. The system may receive smart home events from the hub and, responsive to the received events, arrange to execute smart home functions via a cloud infrastructure. For example, a function may arrange to reduce the cost of operating a smart washing machine. As a result of execution of at least one smart home function, the system may transmit a smart home response to the hub causing at least one of the smart home objects to perform a task (e.g., the washing machine may automatically run when the cost of electricity is low).

Some embodiments comprise: means for receiving, by a smart home hub, sensor information from a plurality of smart home objects associated with a smart home; means for generating, by the smart home hub, smart home events based on the received sensor information; means for receiving, by a computer processor of a central management plane component associated with a cloud-native application runtime, smart home events from the smart home hub; responsive to the received smart home events, mean for arranging to execute smart home functions via a cloud infrastructure; and, as a result of execution of at least one of the smart home functions, means for transmitting a smart home response to the smart home hub causing at least one of the plurality of smart home objects to perform a task.

According to some embodiments, a smart home hub may receive sensor information from a plurality of smart home objects (e.g., a washing machine, an electricity meter, etc.). The smart home hub may also generate smart home events based on the received sensor information. The sensor information may be received via a plurality of different communication protocols. An analytics cloud platform with built-in smart home support may receive smart home information from the smart home hub via an analytic querying protocol adapted to handle big data. The analytics cloud platform may process the received smart home information using a multi-platform query library and automatically analyze the processed data using predictive analytics. The analytics cloud platform may then arrange to display analysis results via an analytics cloud user interface.

Some embodiments may comprise: means for receiving sensor information at a smart home hub from a plurality of smart home objects associated with a smart home, wherein the sensor information is received via a plurality of different communication protocols; means for receiving, by a computer processor of an analytics cloud platform, smart home information from the smart home hub via an analytic querying protocol adapted to handle big data; means for processing the received smart home information using a multi-platform query library; means for automatically analyzing the processed data using predictive analytics; and means for arranging to display analysis results via an analytics cloud user interface.

Some technical advantages of some embodiments disclosed herein are improved systems and methods to perform smart home event processing and analysis in a secure and efficient manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components, and circuits have not been described in detail so as not to obscure the embodiments.

One or more specific embodiments of the present invention will now be described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Cloud-Native Application Runtime for Smart Home Sensor Functions

Figure 1:
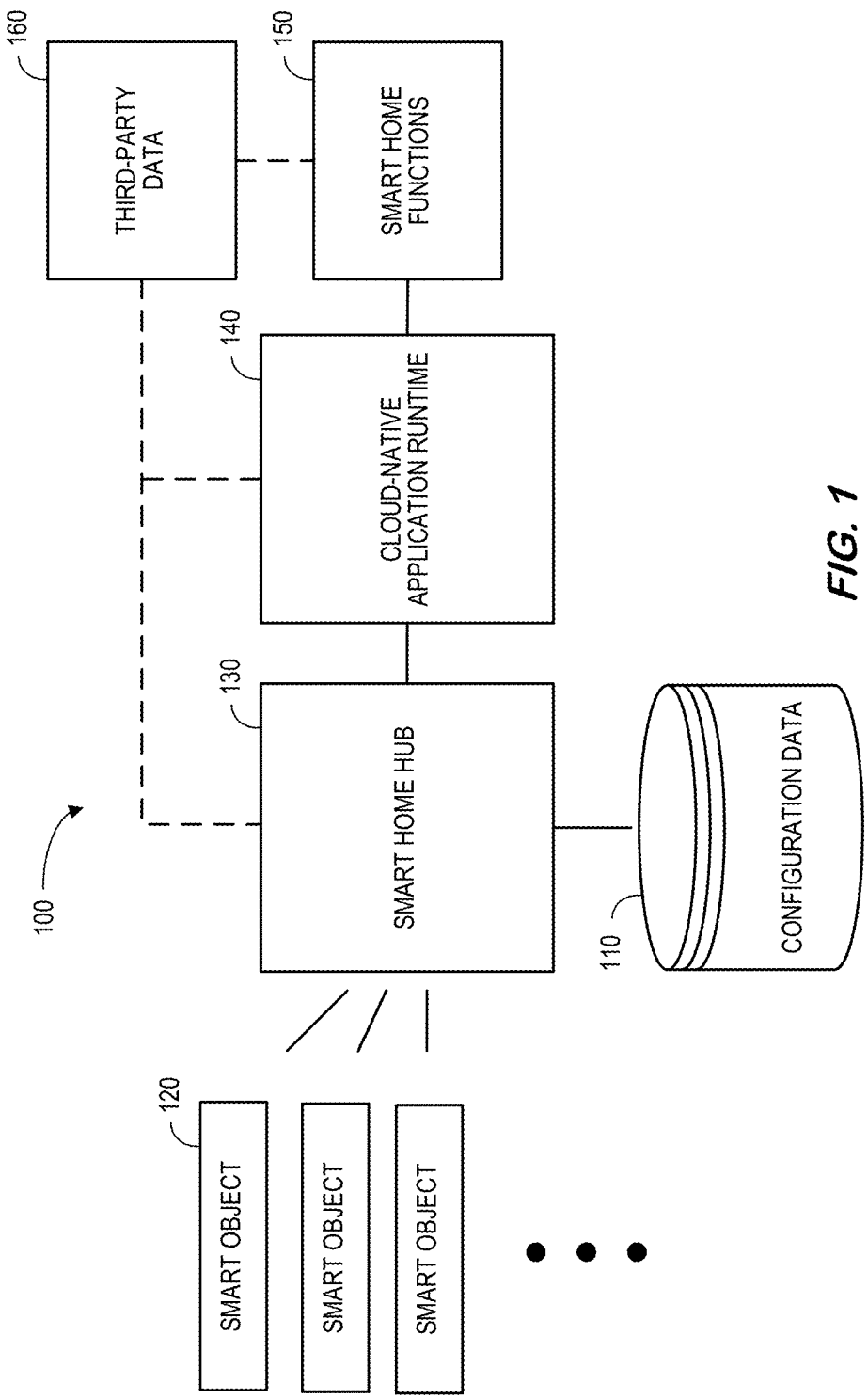
FIG. 1 is a high-level system architecture to facilitate smart home event processing in accordance with some embodiments.

FIG. 1 is a high-level system 100 architecture for smart home event processing in accordance with some embodiments. Embodiments are not limited to the FIG. 1 architecture. The system includes a configuration data 110 storage device (e.g., to store device communication addresses). The system 100 also includes a number of smart objects 120 within a smart home. Examples of smart objects include, but are not limited to, a smart home sensor, an electric vehicle, an electric vehicle charging station, an electricity power meter, a local electricity storage unit (e.g., a battery), a lighting system, a Heating, Ventilation, and Air Conditioning ("HVAC") device (e.g., a thermostat), an occupancy-aware control system (e.g., including motion detectors and door sensors), a home robot, a security system, a camera, a hazard detection device (e.g., a smoke detector), an air quality control device, a smart appliance (e.g., a smart refrigerator), a computer (e.g., a laptop computer), a smartphone, a smartwatch, etc.

The smart objects 120 may transmit information to a smart home hub 130 which can generate smart home events based on the received information. The smart home events may, for example, be transmitted to a cloud-native application runtime 140 comprising a collection of projects to support the extension and integration of monolithic software. The cloud-native application runtime 140 may also be associated with a framework to run distributed systems based on containers. According to some embodiments, the cloud-native application runtime 140 extends applications using serverless functions and microservices. Based on the events received from the smart home hub 130, the cloud-native application runtime 140 may automatically arrange to execute one or more smart home functions 150 and generate a smart home response (e.g., to turn off a light when nobody is in a room). As used herein, the term "automatically" may refer to a device or process that can operate with little or no human interaction.

According to some embodiments, the smart home response is based at least in part on third-party data 160 (e.g., local weather forecasts, police alerts, etc.). The third-party data 160 might be directly accessed by the smart home functions 150 or be utilized by the smart home hub 130 and/or cloud-native application runtime 140 (as illustrated by the dashed lines in FIG. 1).

According to some embodiments, devices, including those associated with the system 100 and any other device described herein, may exchange data via any communication network, which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 100 may store data into and/or retrieve data from various data stores (e.g., the configuration data 110), which may be locally stored or reside remote from various elements. Although a single smart home hub 130 is shown in FIG. 1, any number of such devices may be included. Moreover, various devices described herein might be combined according to embodiments of the present invention. Some or all of the system 100 functions may be performed by a constellation of networked apparatuses, such as in a distributed processing or cloud-based architecture.

An operator or administrator may access the system 100 via a remote device (e.g., a Personal Computer ("PC"), tablet, or smartphone) to view data about and/or manage operational data in accordance with any of the embodiments described herein. In some cases, an interactive graphical user interface display may let the operator or administrator define and/or adjust certain parameters (e.g., to set up or adjust various mapping relationships) and/or provide or receive automatically generated recommendations, results, and/or alerts from the system 100.

Figure 2:
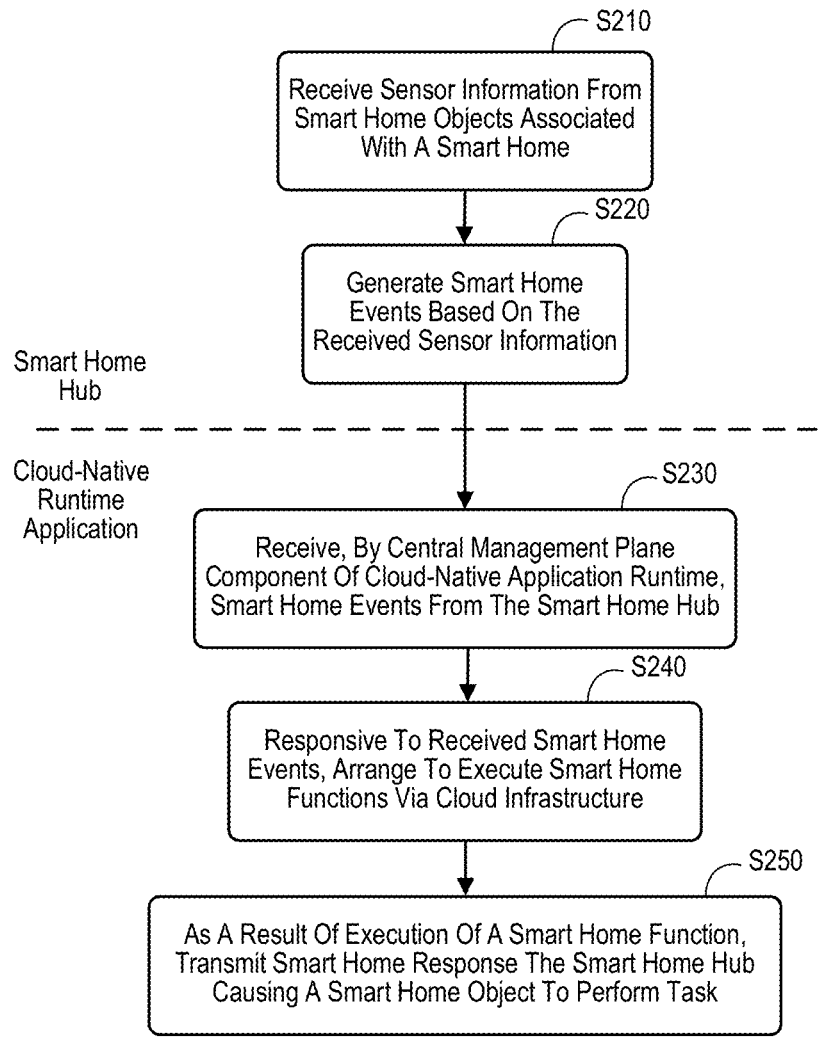
FIG. 2 illustrates a method to facilitate smart home event processing according to some embodiments.

FIG. 2 illustrates a method to facilitate smart home processing in a secure and efficient manner according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store instructions that when executed by a machine result in performance according to any of the embodiments described herein.

At S210, a smart home hub may receive sensor information from a plurality of smart home objects associated with a smart home. At S220, the smart home hub may generate smart home events based on the received sensor information. At S230, a computer processor of a central management plane component associated with a cloud-native application runtime may receive the smart home events from the smart home hub. Responsive to the received smart home events, the system may arrange to execute smart home functions via a cloud infrastructure at S240. As a result of execution of at least one of the smart home functions, the system may transmit a smart home response to the smart home hub causing at least one of the plurality of smart home objects to perform any type of task at S250 (e.g., to begin or end performing a service, to turn on or off, to lock a door, to begin or end recording, etc.).

Figure 3:
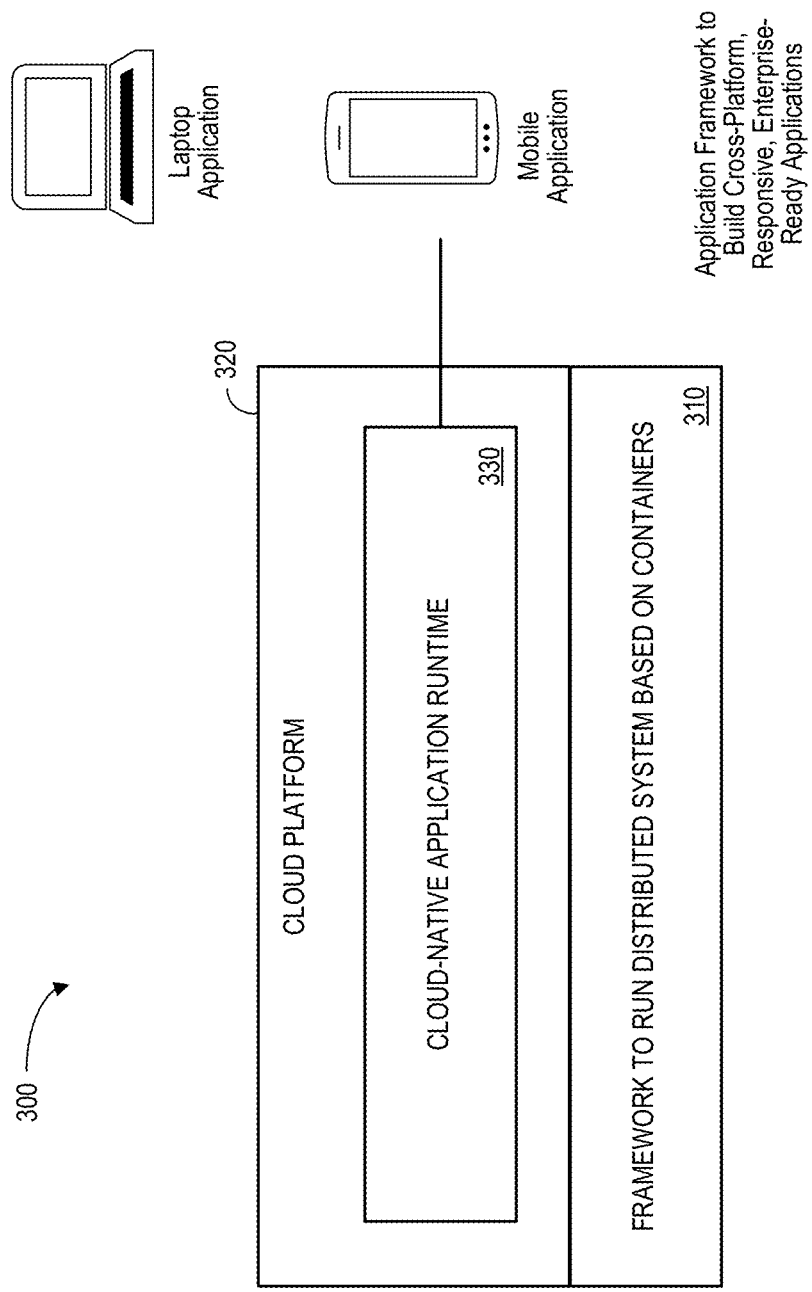
FIG. 3 is a cloud-based implementation in accordance with some embodiments.

FIG. 3 is a cloud-based implementation 300 in accordance with some embodiments. A framework to run a distributed system based on containers 310 may support a cloud platform 320. The cloud platform 320 may execute a cloud-native application runtime 330 that interacts with laptop applications, mobile applications, an application framework to build cross-platform, responsive, enterprise-ready applications.

Figure 4:
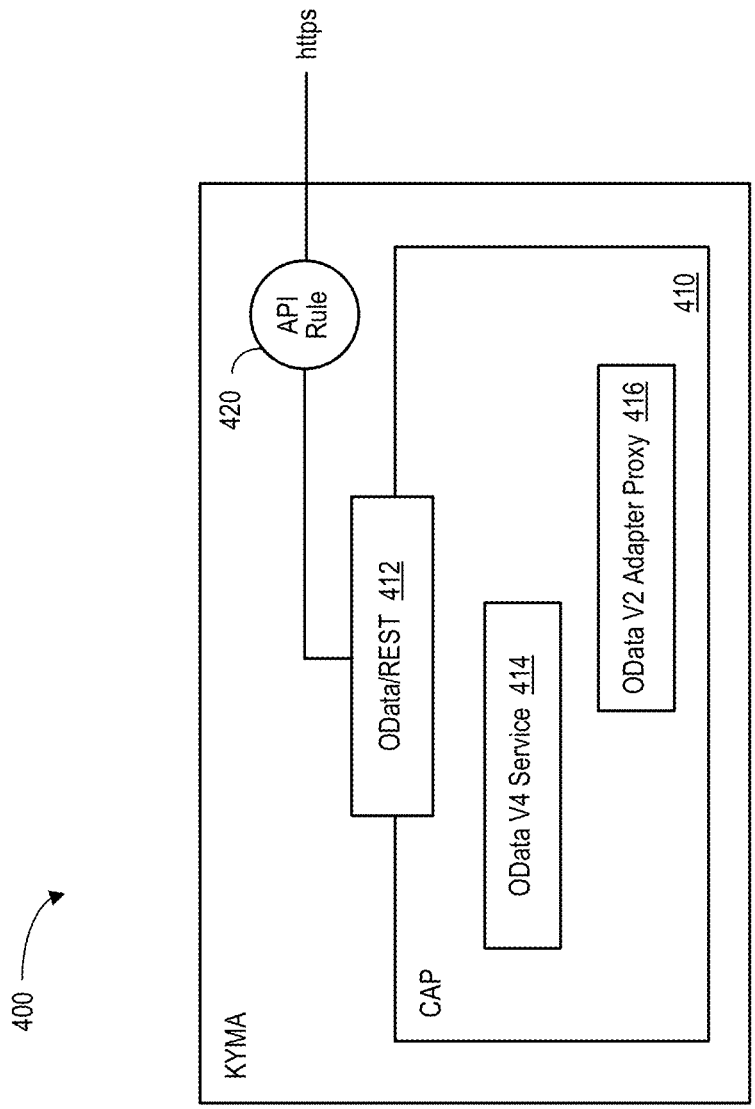
FIG. 4 is an example of a cloud-native application runtime according to some embodiments.

According to some embodiments, the cloud-native application runtime 330 may comprise a KYMA™ runtime. For example, FIG. 4 is an example of a KYMA cloud-native application runtime 400 according to some embodiments. The KYMA runtime 400 includes an API rule 420 that may exchange HTTPS information with other devices (e.g., to support laptop applications, mobile applications, etc.). The API rule 420 communicates with Cloud Application Programming ("CAP") 410 via an Open Data ("OData") protocol or Representational State Transfer ("REST") interface 412. The CAP 410 may include, for example, an OData Version 4 ("V4") service 414 and/or an OData Version 2 ("V2") adapter proxy 416.

Note that the smart home market has been largely unexplored and unexploited by many enterprises. Some embodiments described herein use the SAP® Business Technology Platform ("BTP") and KYMA runtime 400 to manage and control smart home devices. The BTP and KYMA runtime 400 represent a fully managed KUBERNETES-based runtime. The approach may let partners and customers build extensions by using both microservice and serverless functions. It may expand extension suite capabilities to better accommodate cloud-native developer persona while still supporting their development environments of choice.

Instead of products connecting directly to the KYMA runtime 400, devices of a smart home may send out smart home events via a special hub. In turn, the events may trigger execution of arbitrary smart home functions in the KYMA runtime 400. Note that KYMA is an open-source platform for extending applications with serverless functions and microservices. It provides a selection of Cloud Native Computing Foundation ("CNCF") projects configured together to simplify the creation and management of cloud applications built on KUBERNETES.

Figure 5:
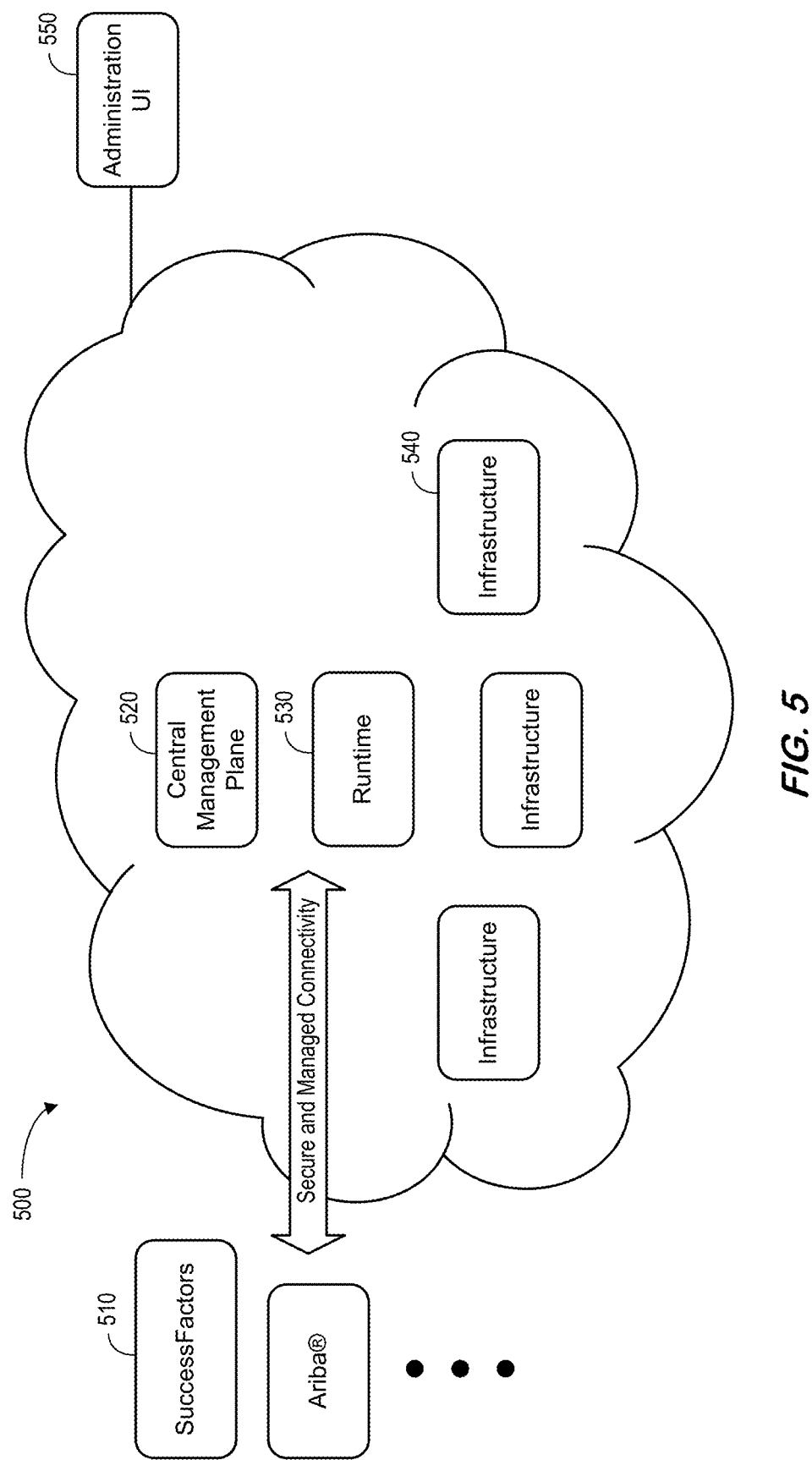
FIG. 5 is a cloud implementation overview in accordance with some embodiments.

Available through Cloud Platform Enterprise Agreements ("CPEA"), the KYMA runtime 400 gives organizations the ability to develop application extensions with their cloud-native developers. The runtime can be conveniently configured and managed by a central management plane which provides out-of-the-box connectivity to SAP® S/4HANA (e.g., Software-as-a-Service ("SaaS") applications running in a cloud). For example, FIG. 5 is a cloud implementation 500 overview in accordance with some embodiments. Here, various clouds 510 (SuccessFactors, Ariba®, etc.) would establish secure and managed connectivity with a central management plane 520 and runtime 530 that control various cloud infrastructures 540 (e.g., AMAZON® Web Services ("AWS"), GOOGLE® Cloud Platform ("GCP"), MICROSOFT® AZURE, etc.). An administration User Interface ("UI") 550, such as SAP® COCKPIT, might be used to configure various aspects of the cloud implementation 500. The clouds 510 can send business events to the central management plane 520 where customer-specific functionality is then executed. The central management plane 520 might support secured application connectivity, a central application APIs and events registry, and standardized service management and consumption. For example, a commerce cloud 510 might send out a "business partner created" event with the business partner data as payload. A custom function may then be on to check the correctness of the data.

Note that the KYMA runtime and the open-source project "KYMA" (OS) may offer slightly different functionalities and install different sets of components. The KYMA environment provides a fully managed KUBERNETES runtime based on the open-source project "KYMA." This cloud-native solution allows developers to extend solutions with serverless functions and combine them with containerized microservices. The offered functionality ensures smooth consumption of applications, running workloads in a highly scalable environment, and building event-based and API-based extensions. A KYMA environment may comprise:

a KUBERNETES cluster provisioned through a project "Gardener" on a cloud provider and region (data center) to abstract environment specifics and deliver a homogeneous KUBERNETES-native DevOps experience;
   and an open-source project "KYMA" installed in its latest version on the provisioned cluster.

Figure 6:
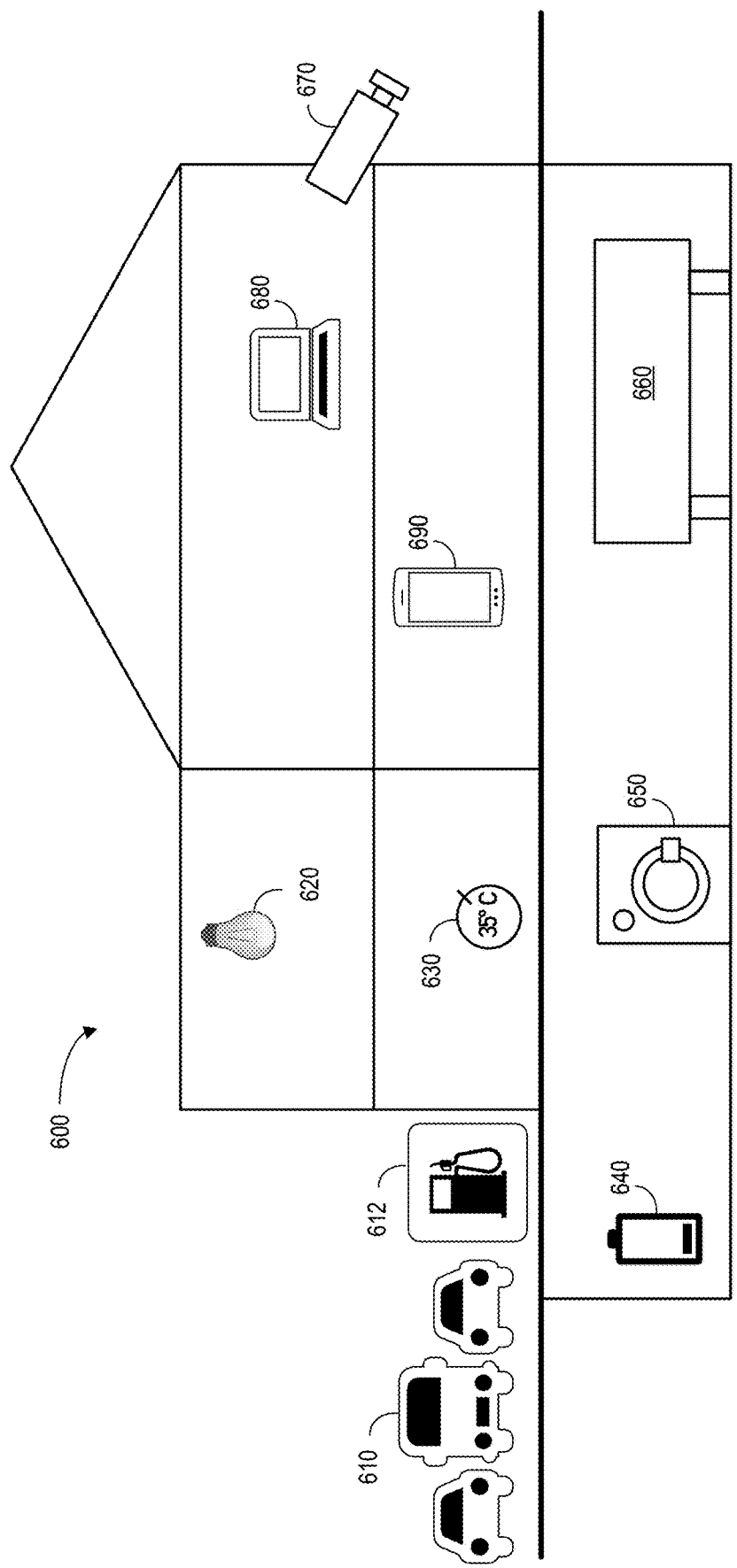
FIG. 6 is an example of an automated smart home according to some embodiments.

FIG. 6 is an example of an automated smart home 600 according to some embodiments. The smart home 600 may include smart home objects, such as electric vehicles 610, an electric vehicle charging station 612, a lighting fixture or system 620, a thermostat 630, a local energy storage unit 640 (e.g., a battery), a washing machine 650, an oil fuel tank 660, a video camera 670. The smart home 600 may also include personal computing devices such as a laptop computer 680 and/or a smartphone 690. The smart home 600 may be equipped with interfaces for wireless communication or a home Wireless Sensor Network ("WSN"). Each home may have a WSN, and the sensed data from each device may be forwarded to a central station or home "hub." Each node in the home WSN may be considered a smart device and have some computation and communication capabilities. The home hub can be any one device (a smart meter, PC, tablet, laptop 680 or smartphone 690) that has data storage capacity, performs local processing, and/or communicates with devices outside of the home WSN. In a residential complex or buildings, hub may an additional feature that it is responsible for managing data from/to shared distributed production sources. For example, renewable sources are often shared among consumers such as a residential building with a solar panel of Photo-Voltaic ("PV") systems on the roof (and the panel is used by multiple households in the building). Note that each distributed renewable energy source might be considered a smart object or device.

Figure 7:
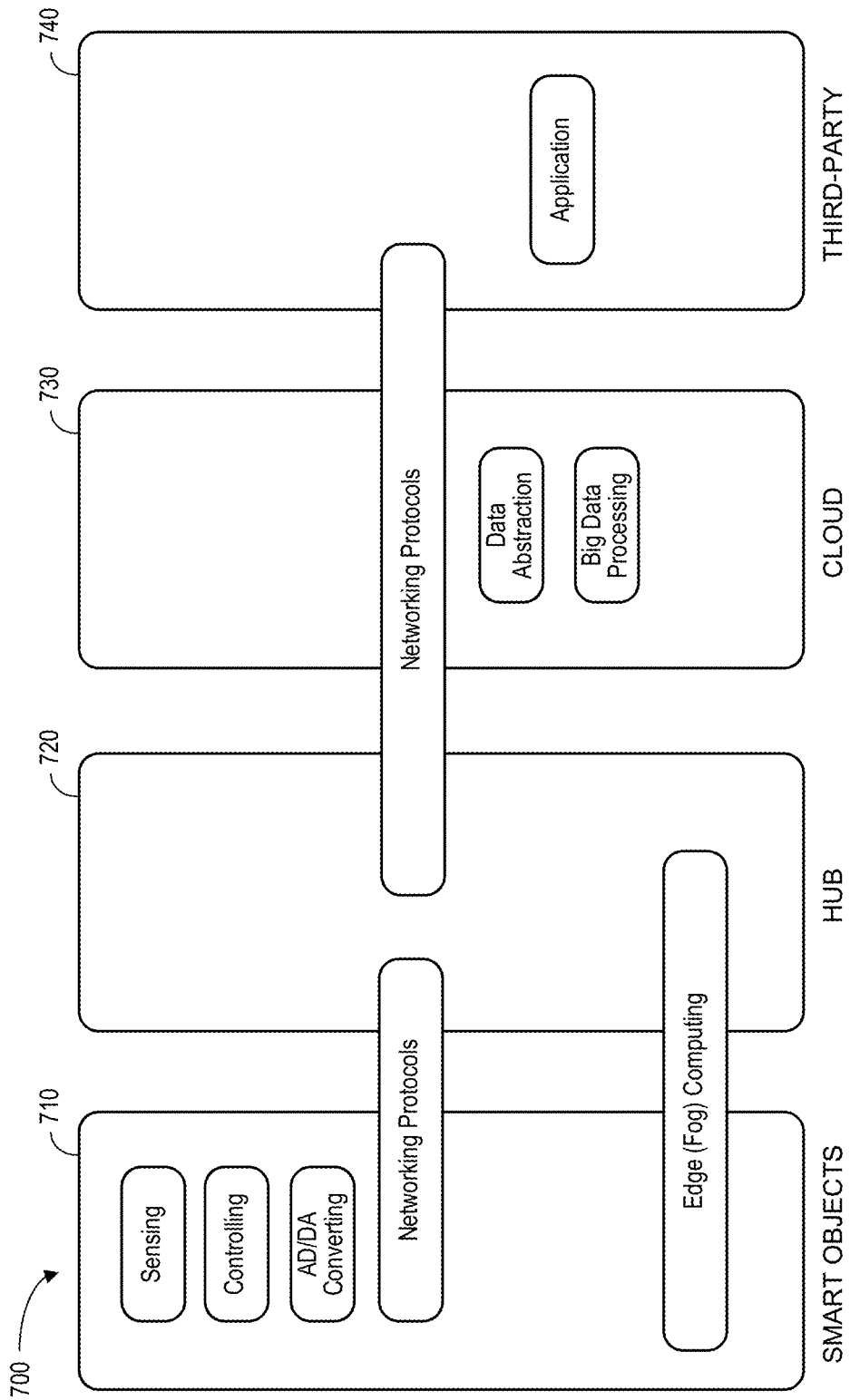
FIG. 7 is a smart home management model in accordance with some embodiments.

FIG. 7 is a smart home management model 700 in accordance with some embodiments. The model 700 is associated with a conceptual smart home management system and the main tasks that should be performed at each level. The model 700 includes smart objects 710. For example, home appliances, lights, or sensors attached to production or transmission lines in a smart grid system might be considered smart objects. They can sense, actuate, process data, and communicate. In order to sense and actuate, they may perform Analog-to-Digital ("A/D") and/or Digital-to-Analog ("D/A") conversions.

Home automation is building automation for a smart home or smart house. A home automation system might monitor and/or control home attributes such as lighting, climate, entertainment systems, appliances, etc. It may also include home security such as access control and alarm systems. When connected with the Internet, home devices may represent an important constituent of the IoT.

A home automation system typically connects controlled devices to a central smart home hub (sometimes called a "gateway"). The user interface for control of the system uses either wall-mounted terminals, tablet or desktop computers, a mobile phone application, or a Web interface that may also be accessible off-site through the Internet. The smart objects 710 might include, for example: HVAC systems; lighting control systems (e.g., a "smart" network that incorporates communication between various lighting system inputs and outputs using one or more central computing devices); occupancy-aware control systems (e.g., to sense occupancy of the home using smart meters and environmental sensors such as $CO_2$); appliance control and integration with the smart grid and a smart meter (e.g., using high solar panel output in the middle of the day to run washing machines); home robots and security (e.g., providing access control and central locking of all perimeter doors and windows); hazard sensors (e.g., water leak detection, smoke detectors, and CO detectors); air quality control (inside and outside); and smart kitchen devices (e.g., with refrigerator inventory, premade cooking programs, cooking surveillance, etc.). The smart objects 710 may periodically perform sensing and send (wirelessly of wired) sensed data to a hub 720. Moreover, if protocols allow it, sensed data might be sent directly to the cloud. If possible, smart objects 710 may perform basic data processing before transmitting the sensed data.

Performing a task or actuating can be also controlled remotely. Home appliances might be divided in three categories: non-flexible, flexible, and dual nature appliances. The non-flexible appliances are those that are associated with baseline loads or non-preemptive tasks (e.g., a light fixture, TV, PC, or hair drier) and cannot be controlled by the system. The flexible appliances are associated with regular loads or preemptive tasks (e.g., heating or air-conditioning) and can be automatically operated by the system. The dual nature appliances sometimes can act as flexible, but sometimes as nonflexible (e.g., a washing machine, dishwashing machine, or laundry drier). For example, sometimes a consumer might not care about the exact time the dish washing machine will operate, as long as it is within a predefined time frame. These appliances may, for example, present burst loads. The smart objects 710 (both flexible and dual nature) may be equipped with smart power outlets that are able to measure power consumption and control operation in substantially real-time.

The smart objects 710 may use networking protocols to send information to a smart home hub 720. The hub 720 is a device that is responsible for collecting raw and/or processed data from the smart objects 710 and forwarding information to a cloud platform 730. When possible, the hub 720 may perform local data processing to reduce the data flow towards the cloud 730. Furthermore, in a smart home scenario, the hub 720 can send commands to the smart objects 710 acting as a local scheduler, regulator, and/or load balancer. In the case of a residential hub, the hub 720 may send commands to the devices that regulate the electricity flow to and/or from a nano-grid, (e.g., to manage operations of buying and/or selling electricity from and/or to the grid).

The hub 720 may understand the communication protocols used by the smart objects 710. The hub 720 might be needed, for example, to enable interoperability between the smart objects 710 (since the devices generally cannot communicate with each other). Hence, sometimes a household may need more than one hub. In the future, when full interoperability among smart objects 710 is achieved, hubs 720 might not be required in the model 700.

The cloud 730 is the most complex part of the home management model 700. The main task of the cloud 730 has typically been to store data. Because of high data volume, traditional approaches may be modified to meet new requirements. New methods and algorithms based on Machine Learning ("ML") techniques, time series processing, and/or advanced analytics might also be employed.

Note that third-party 740 applications typically assume that the data being used is unchanging (that is, the data is usable by applications on a non-real-time basis). In the cloud 730, event-based data may be converted to query-based processing. Such an approach may bridge the differences of real-time IoT networking and the third-party 740 application world. The data may be stored persistently and abstracted at multiple levels so that it can be easily combined, recomputed, and/or aggregated with previously stored data (including some data that comes from non-IoT sources). Moreover, the different levels of abstraction may simplify the application access and usage (because the data is presented in a manner required by third-party 740 applications).

The third-party 740 may develop applications for end users in the form of schedulers, regulators, load balancers, etc. A "scheduler" may refer to, for example, a tool responsible for defining time slots in which dual nature appliances are active. A "regulator" may refer to, for example, a tool responsible for the management of flexible devices (e.g., it might regulate the operation of air conditioners, heaters, dehumidifiers, etc.). "Load balancing" may refer to, for example, applications to optimize energy consumption, such as by considering current market electricity prices and the availability of electricity produced by local renewable sources (if available).

Various tools in the model 700 may need advanced algorithms that use more parameters as compared to those that are obtained by the smart objects 710. They may perform complex tasks of mining and knowledge extraction from available data in the cloud 730 to create consumer and household profiles, (e.g., the available smart home data may lead to the creation of personalized recommendations for different users).

Figure 8:
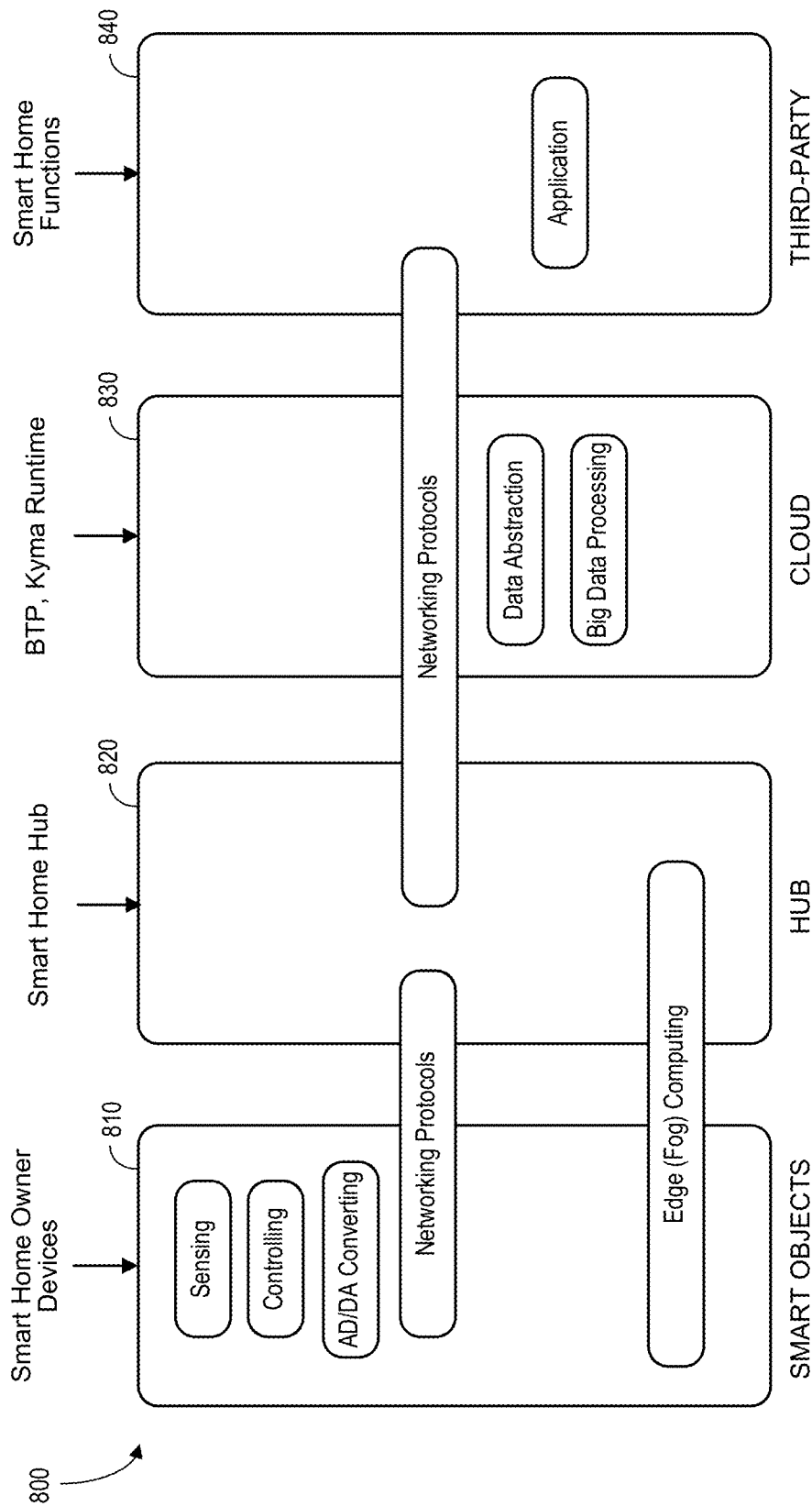
FIG. 8 is a smart home management system according to some embodiments.

Some embodiments may use BTP KYMA runtime for automation and control of smart homes. Thus, an enterprise may be able to tap into a huge market and increase the reach and usage of embodiments significantly. A conceptual smart home management approach may be represented in FIG. 8 as a smart home management system 800 according to some embodiments. The system 800 includes smart objects 810, such as the smart devices in a smart homeowner's house which connect to a smart home hub 820 (e.g., a smart washing machine or smart meter). The hub 820 may comprise a new KYMA runtime hub which acts as intermediary between the smart objects 810 and the KYMA runtime. Smart home events may be triggered by smart objects 810 and relayed to KYMA runtime. A cloud 830 may be represented by the KYMA runtime that execute the smart home functions triggered by smart home events. In turn, smart home responses might be sent back to the hub 820. A third-party 840 may be responsible for developing the smart home functions. The third-party 840 might be, for example, the house owner or a vendor of smart objects 810.

Figure 9:
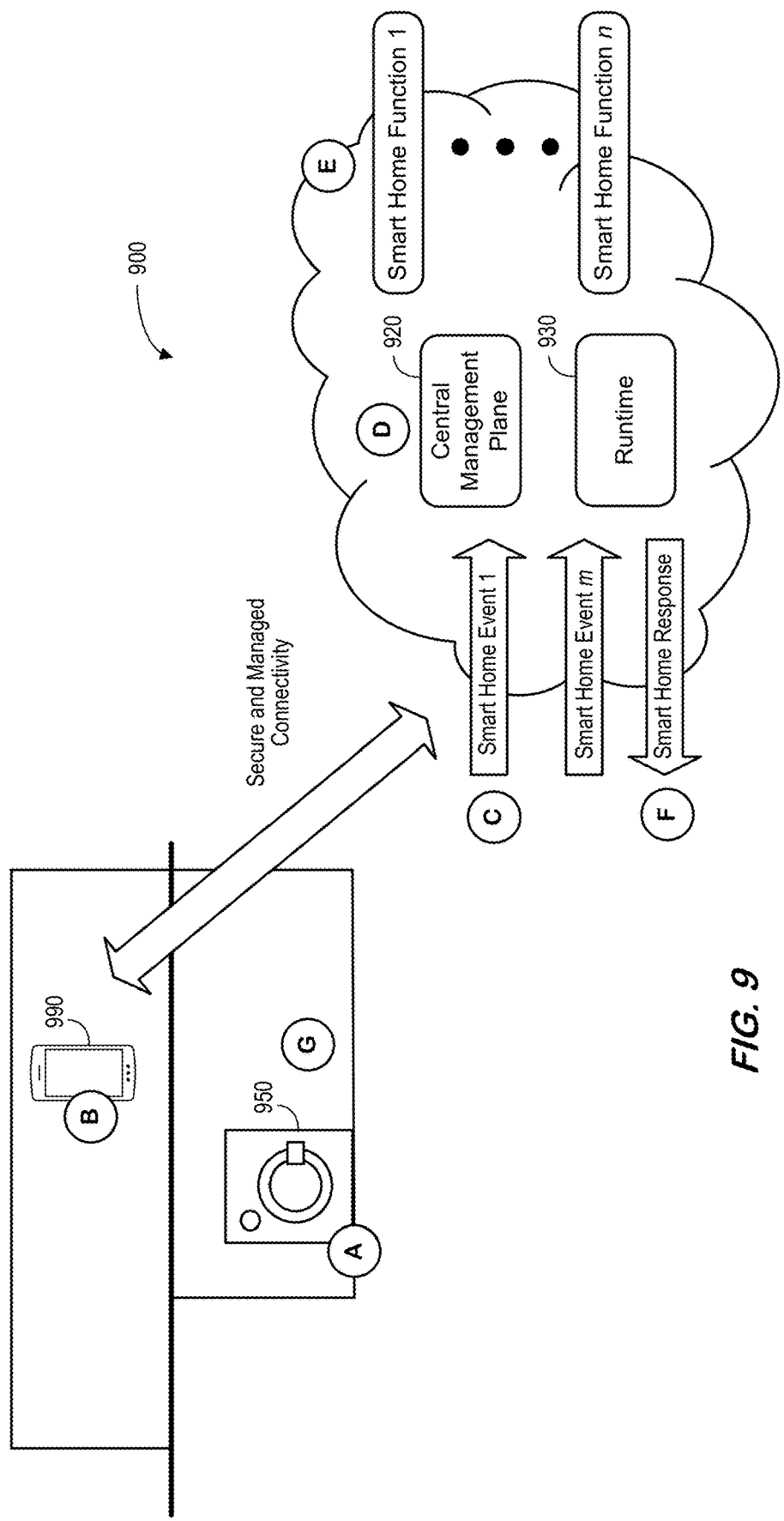
FIG. 9 is an overview of a smart home event processing solution in accordance with some embodiments.

FIG. 9 is an overview of a smart home event processing solution 900 in accordance with some embodiments. Instead of smart objects, such as a washing machine 950, connecting to a central management plane 920 and/or cloud runtime 930 directs, they may send out smart home events via a smart home hub 990 (e.g., a dedicated device or an application running on a smartphone phone). In turn, the events may trigger execution of arbitrary smart home functions in a KYMA runtime.

For example, consider the smart washing machine 950 and a smart power meter. At (A), the smart meter sends an "electrical power flat rate active" signal to the hub 990 at (B) which forwards a corresponding event to the cloud at (C). The central management plane 920 processes the event at (D), and a corresponding "power economy" smart home function is executed in the cloud at (E). In turn, the function may send a "start washing program" smart home response back to the smart washing machine at (F) causing the washing machine turn on at (G) to take advantage of the low power rate.

Figure 10:
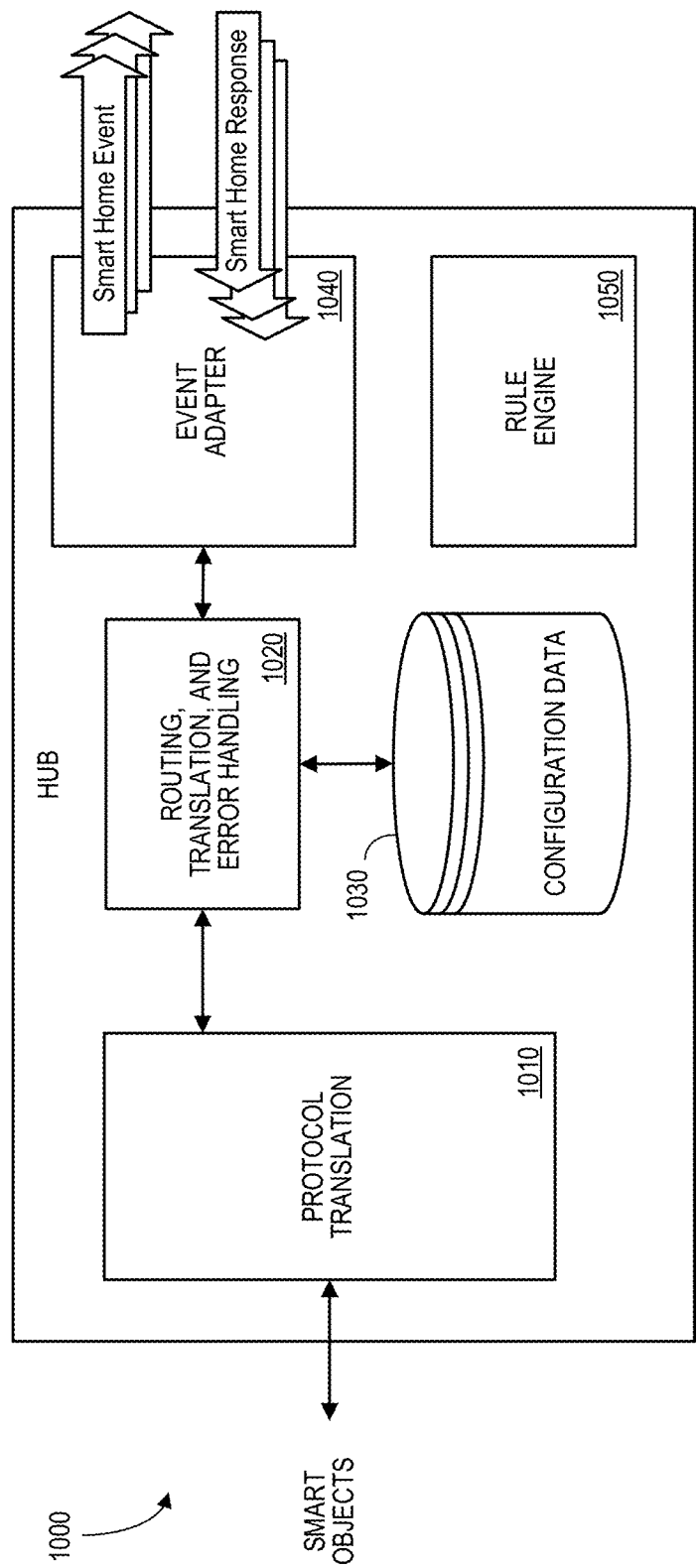
FIG. 10 is a more detailed view of a smart home hub according to some embodiments.

FIG. 10 is a more detailed view of a smart home hub 1000 according to some embodiments. The hub 1000 may include a protocol translation 1010 component to communicate with smart home objects (e.g., to receive events and transmit responses). The protocol translation 1010 component might exchange information via, for example, a protocol associated with infrared, Ethernet, Wi-Fi, Bluetooth, a Thread network, a Zigbee PAN, Z-Wave mesh networking, etc. A routing, translation, and error handling 1020 component and configuration data 1030 may be used to determine an appropriate communication address and/or protocol for each smart object. The hub 1000 may maintain device identifiers and sessions in order to be able to map smart home events and responses. An event adapter 1040 may send smart home events to execute functions in a cloud runtime and receive associated responses. A rule engine 1050 may help the hub 1000 determine which functions should be executed. In this way, the smart home hub 1000 may act as a central component, enabler, intermediary, and router between the smart devices and cloud runtime functions.

Built-In Cloud Analytics Support for Smart Homes

Figure 11:
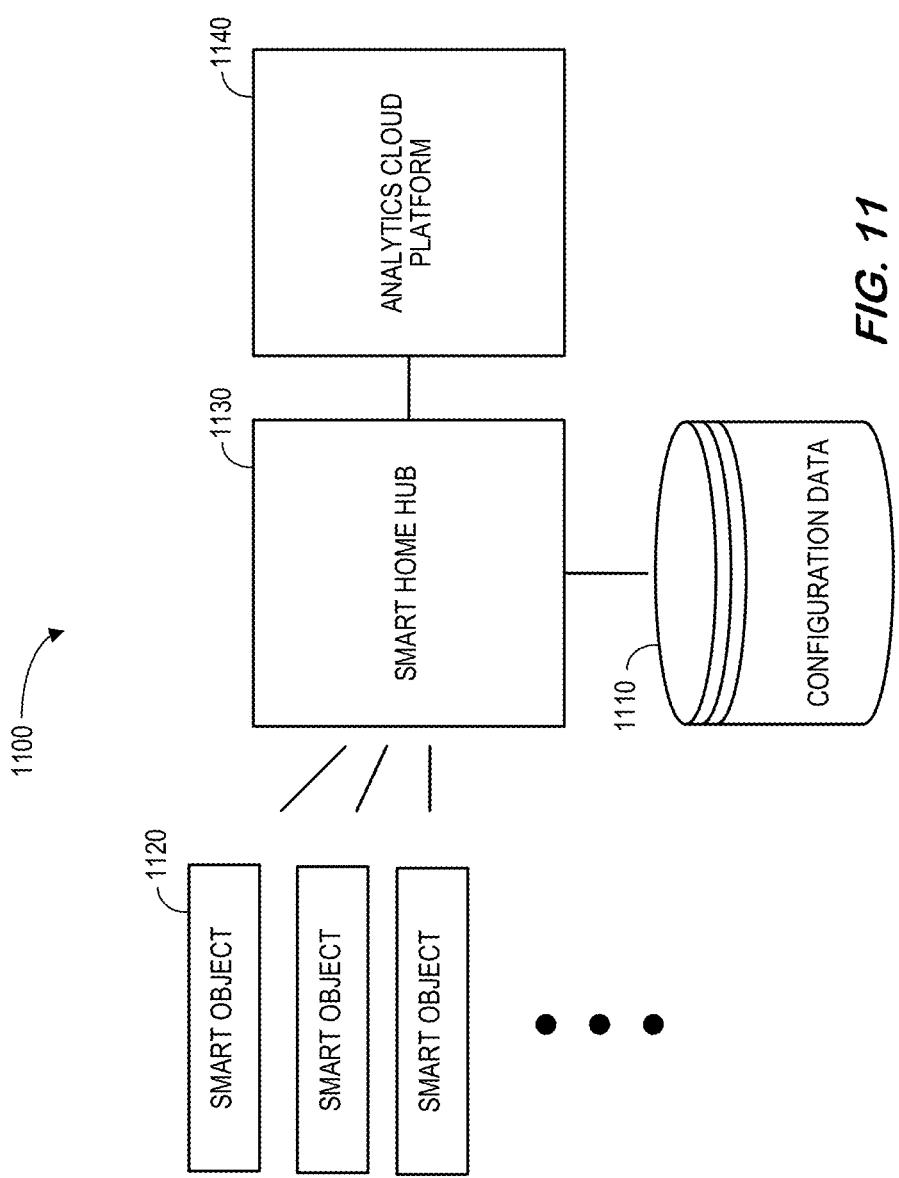
FIG. 11 is a high-level system architecture to facilitate smart home analysis in accordance with some embodiments.

FIG. 11 is a high-level system 1100 architecture for smart home analysis in accordance with some embodiments. Embodiments are not limited to the FIG. 11 architecture. The system includes a configuration data 1110 storage device (e.g., to store device communication addresses). The system 1100 also includes a number of smart objects 1120 within a smart home. Examples of smart objects include, but are not limited to, a smart home sensor, an electric vehicle, an electric vehicle charging station, an electricity power meter, a local electricity storage unit (e.g., a battery), a lighting system, an HVAC device (e.g., a thermostat), an occupancy-aware control system (e.g., including motion detectors and door sensors), a home robot, a security system, a camera, a hazard detection device (e.g., a smoke detector), an air quality control device, a smart appliance (e.g., a smart refrigerator), a computer (e.g., a laptop computer), a smartphone, a smartwatch, etc.

The smart objects 1120 may transmit information to a smart home hub 1130. Information from the smart home hub 1130 may then be provided to an analytics cloud platform 1140 with built-in smart home support. The information from the smart home hub 1130 may be transmitted to the analytics cloud platform 1140 via an analytic querying protocol adapted to handle big data (e.g., IoT type data). The analytics cloud platform 1140 may then process the received smart home information using a multi-platform query library and automatically analyze the processed data using predictive analytics. As used herein, the term "automatically" may refer to a device or process that can operate with little or no human interaction. The analytics cloud platform 1140 may then arrange to display analysis results via an analytics cloud user interface.

According to some embodiments, devices, including those associated with the system 1100 and any other device described herein, may exchange data via any communication network, which may be one or more of a LAN, a MAN, a WAN, a proprietary network, a PSTN, a WAP network, a Bluetooth network, a wireless LAN network, and/or an IP network such as the Internet, an intranet, or an extranet. Note that any devices described herein may communicate via one or more such communication networks.

The elements of the system 1100 may store data into and/or retrieve data from various data stores (e.g., the configuration data 1110), which may be locally stored or reside remote from various elements. Although a single smart home hub 1130 is shown in FIG. 11, any number of such devices may be included. Moreover, various devices described herein might be combined according to embodiments of the present invention. Some or all of the system 1100 functions may be performed by a constellation of networked apparatuses, such as in a distributed processing or cloud-based architecture.

An operator or administrator may access the system 1100 via a remote device (e.g., a PC, tablet, or smartphone) to view data about and/or manage operational data in accordance with any of the embodiments described herein. In some cases, an interactive graphical user interface display may let the operator or administrator define and/or adjust certain parameters (e.g., to set up or adjust various mapping relationships) and/or provide or receive automatically generated recommendations, results, and/or alerts from the system 1100.

Figure 12:
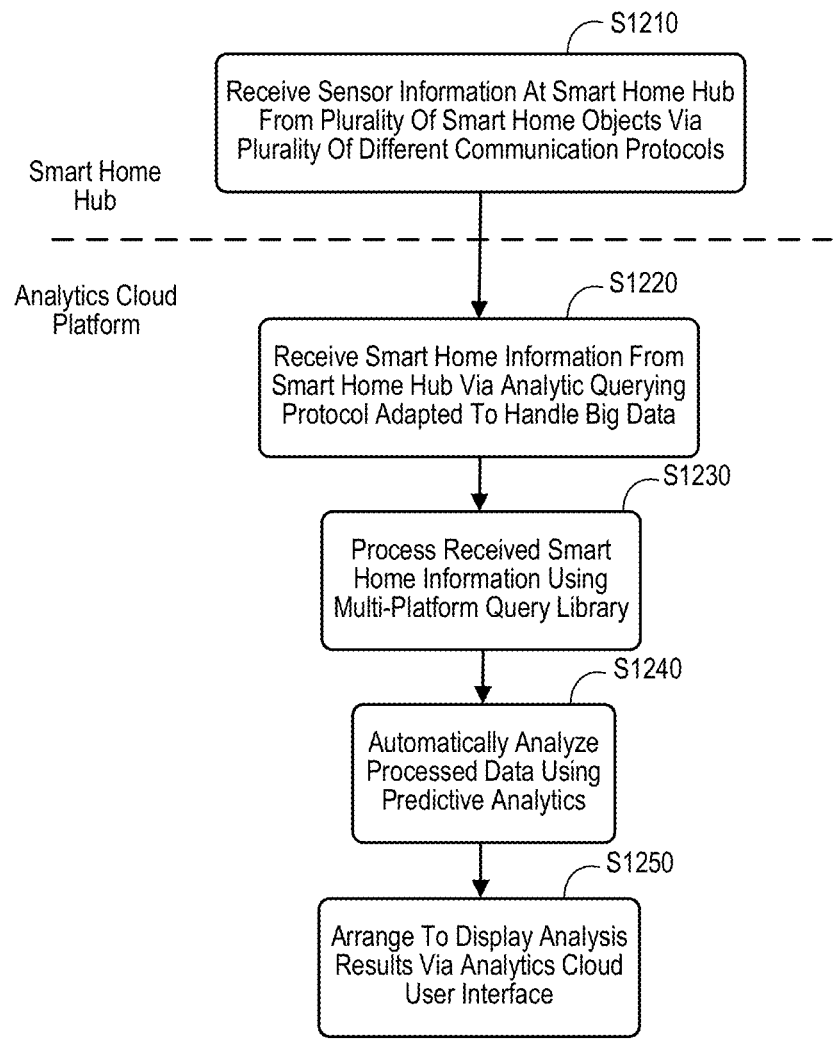
FIG. 12 is a smart home analysis method according to some embodiments.

FIG. 12 illustrates a method to facilitate smart home processing in a secure and efficient manner according to some embodiments. At S1210, sensor information may be received at a smart home hub from a plurality of smart home objects associated with a smart home, wherein the sensor information is received via a plurality of different communication protocols. At S1220, a computer processor of an analytics cloud platform may receive smart home information from the smart home hub via an analytic querying protocol adapted to handle big data. At S1230, the system may process the received smart home information using a multi-platform query library and automatically analyzing the processed data using predictive analytics at S1240. At S1250, the system may arrange to display analysis results via an analytics cloud user interface.

Some embodiments described herein may use an analytics cloud, such as the SAP® Analytics Cloud ("SAC"), for visualizing, monitoring, and/or analyzing smart home devices. SAC is a SaaS built natively on the SAP® Business Technology Platform ("BTP") (previously the SAP® Cloud Platform ("SCP")) that lets organizations close the gap between transactions, data preparation, analysis, and action—providing all analytics capabilities in one offering. The analytics cloud may combine Business Intelligence ("BI"), planning, and predictive analytics as well as new capabilities such as simulation and automated discovery in BI, storytelling, and predicted forecasts in planning. Embodiments may let customers take advantage of high-speed innovation in the cloud while using existing on-premises investments. In some embodiments, customers may subscribe to an analytics cloud as a single solution (with specific capabilities that can be licensed separately or together).

Figure 13:
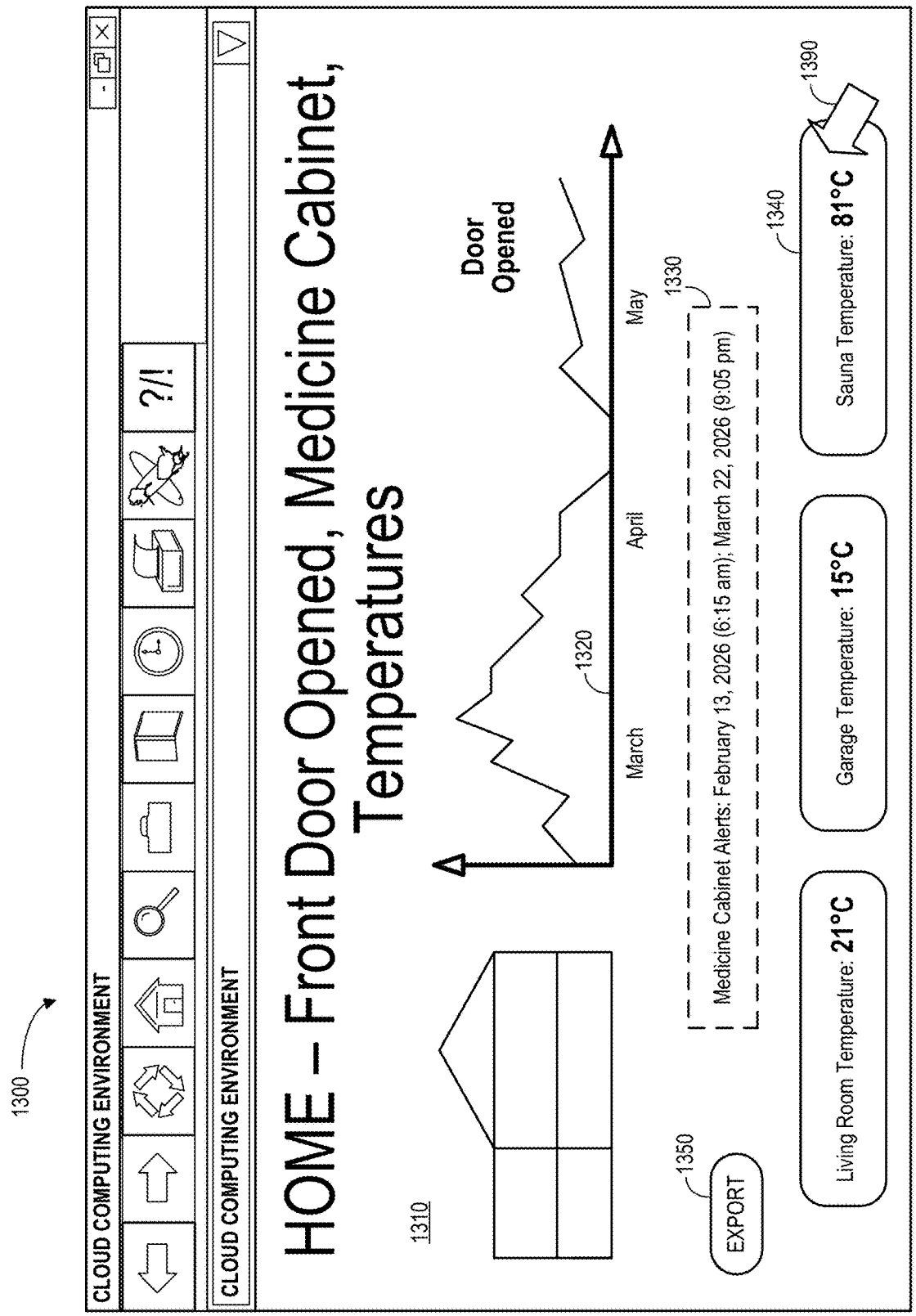
FIGS. 13 and 14 are smart home analysis displays in accordance with some embodiments.
Figure 14:
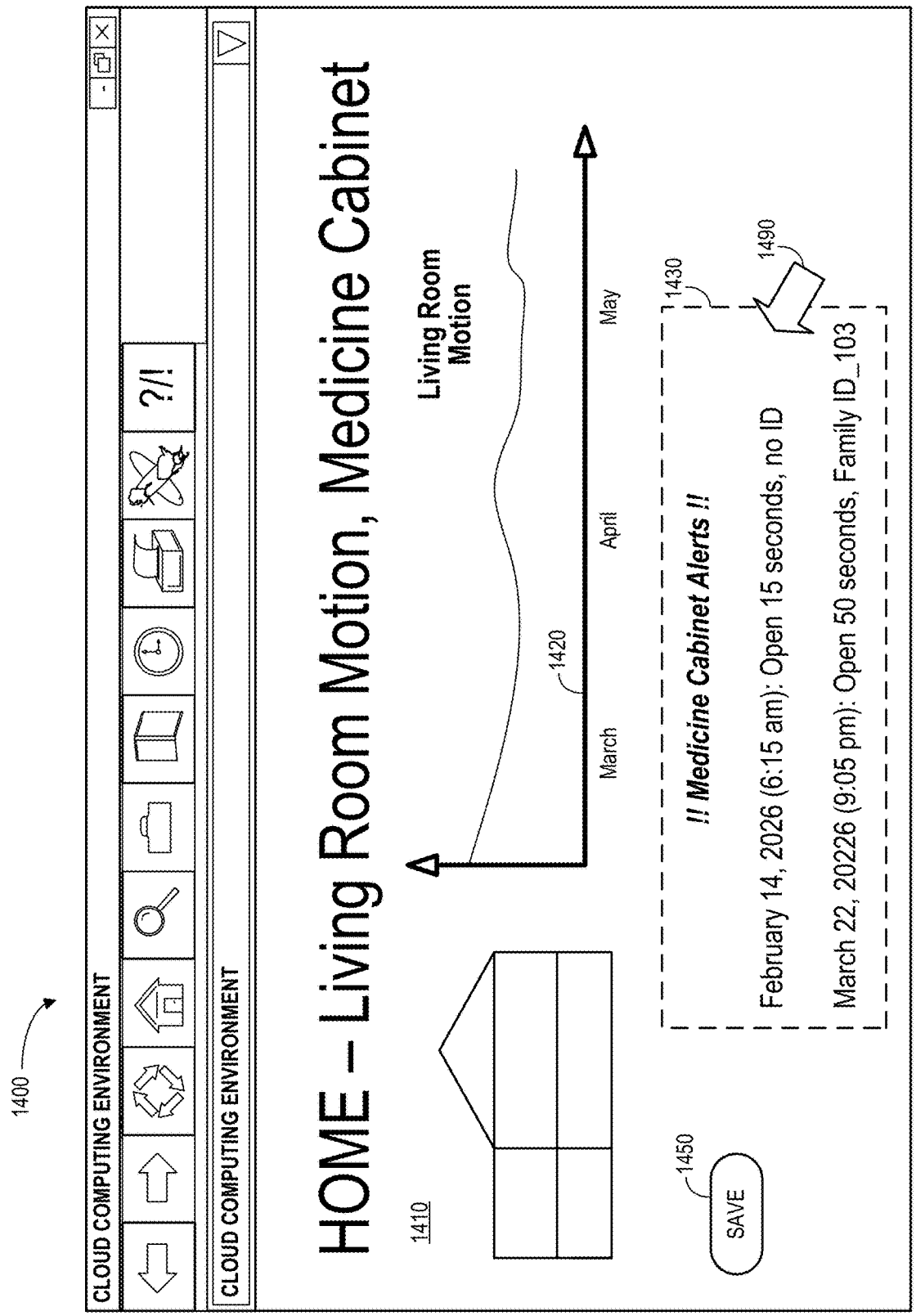

FIGS. 13 and 14 are smart home analysis displays in accordance with some embodiments. For example, FIG. 13 is a display 1300 with graphical elements 1310 for a smart home including a graph 1320 that shows how often a front door was opened over a period of time (e.g., a larger number of door openings might be associated with a home renovation project and a lack of door openings might be associated with a family vacation). Alerts 1330 may indicate, for example, when a medicine cabinet was opened, smoke detector events, etc. and various current temperatures 1340 within the smart home. Selection of an "Export" icon 1350 (e.g., via touchscreen or computer mouse pointer 1390) may transfer the data (e.g., to an EXCEL® spreadsheet application or a pdf report). According to some embodiments, user selection may provide further details about any of these elements 1310. For example, FIG. 14 is a display 1400 with graphical elements 1410 for a smart home including a graph 1420 that shows how living room motion detected over a period of time. Detailed alert 1430 information may indicate, for example, details about when a medicine cabinet was opened (e.g., displayed when the user selected the general alert 1330 information in FIG. 13). Selection of a "Save" icon 1450 (e.g., via touchscreen or computer mouse pointer 1490) may store a snapshot of the current smart home status.

Figure 15:
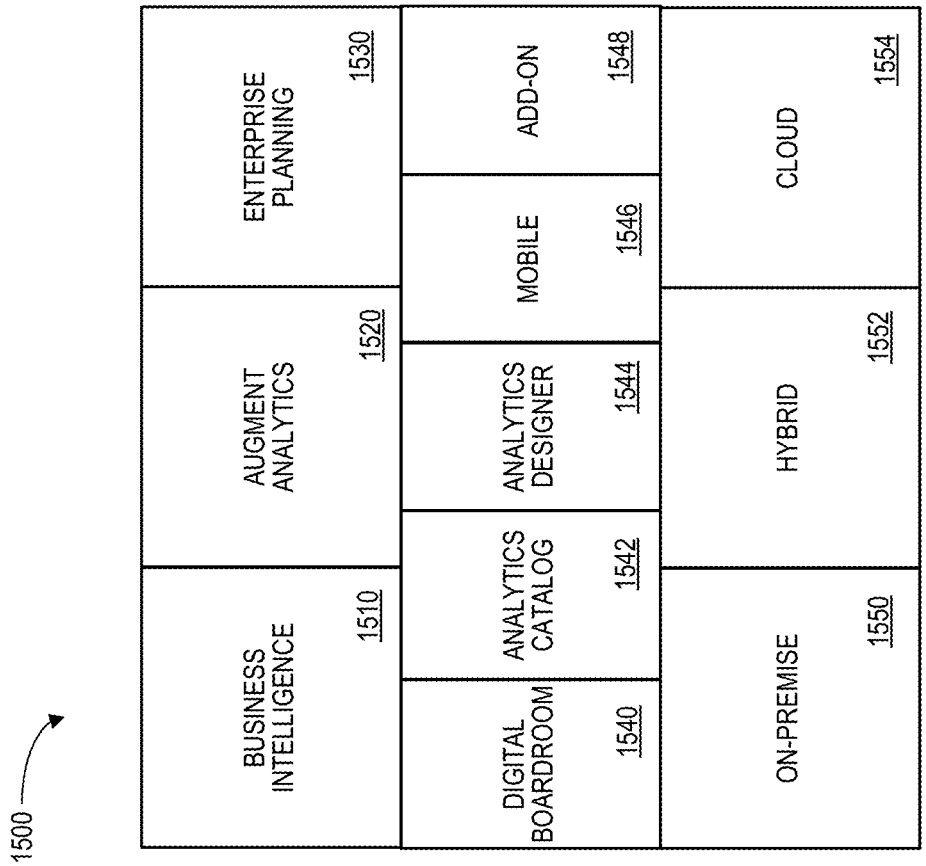
FIG. 15 is an analytics cloud overview in accordance with some embodiments.

Embodiments may utilize native, built-in smart home support for an analytics cloud. This may facilitate improved performance for the connection and increased convenience for the user. Note that decision-making is a continuous process. There may be a number of steps involved when making a data-driven decision and taking action. A user might, for example, start with a question that needs answering or may have received an alert that prompts investigation. The user may then analyze what's happening, predict what's likely to happen next, simulate potential actions, plan accordingly, take an action, and then monitor/report on the results of the action. FIG. 15 is an analytics cloud overview 1500 in accordance with some embodiments. The analytics cloud may provide BI 1510, augmented analytics 1520, and enterprise planning 1530. To serve the needs of many types of decision makers in an organization (and make better decisions), an analytics solution may have various capabilities in one product so that everyone can make fast, confident decisions. Embodiments may utilize an SAP® digital boardroom 1540 and analytics catalog 1542 (which may be part of an analytics cloud). An analytics designer 1544 can be used to compose analytic applications and embed analytics in other applications. An analytics cloud might have web, MICROSOFT® OFFICE™ and mobile UIs 1546 (as well as add-ons 1548) for different types of users to access on-premise 1550, hybrid 1552, and/or cloud data 1554.

Figure 16:
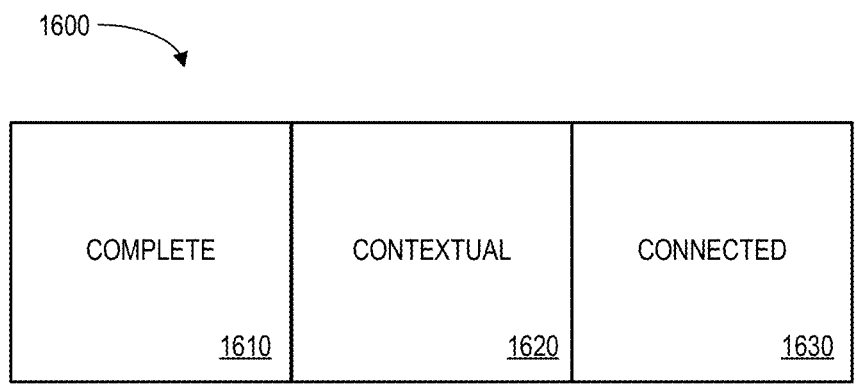
FIG. 16 illustrates analytics cloud features according to some embodiments.

FIG. 16 illustrates analytics cloud 1600 features according to some embodiments. The analytics cloud 1600 may be "complete" 1610 so that user may make better decisions and act faster (because the analytics and planning may be incorporated in one place). Note that most analytics tools do not have planning capabilities and instead require users to access separate products for planning and analysis. By being complete 1610, the analytics cloud may help improve decision-making with analytics and planning capabilities so that user may:

ask, analyze, predict, plan, act, and report in one place;
meet the diverse needs of all types of roles and decisions; and
connect people and plans across the enterprise.

The analytics cloud 1600 may also be "contextual" 1620 to let users get needed actionable insights to be embedded where they work. For example, if a user runs SAP® cloud-based enterprise applications, such as S/4HANA or SuccessFactors, the analytics cloud is embedded directly in those applications for analytics in-context of business processes (versus standalone). The analytics cloud delivers analytics in context of SAP® cloud enterprise applications like S/4HANA and SuccessFactors with prepackaged business content for industries and lines of business, and the ability to upgrade to a full use (enterprise) license so users can:

receive relevant insights embedded in cloud-based applications;
move from embedded to enterprise analytics for 360° insights across departments; and
accelerate time-to-value with pre-built business content.

In addition, the analytics cloud 1600 may be "connected" 1630 to transform all of the data into needed answers. This is, it has unique direct access to SAP® data sources such as BW, S/4HANA, BusinessObjects Universes, etc. and is part of a common cloud infrastructure that helps users access, manage, analyze, and take action on all of the data for maximum value. Such an approach may provide unique, direct connectivity to data sources plus data integration, management, and analysis capabilities on a common, enterprise-grade infrastructure in the cloud for all data users can:

unite SAP® and other data on an open data and analytics foundation with complete analytics including planning capabilities;
gain live, trusted insights into SAP® data sources; and
save time and reduce errors with plan and actual data together for one version of the truth.

In some embodiments, the analytics cloud is a cloud-only analytics application platform built on the SAP® HANA cloud platform. It may be written primarily in JavaScript, with most of the backend code within HANA XS (plus Java code) and a rich web client running within the browser. It may access some data via replication and other data via live querying from the browser using a proprietary analytic querying protocol (such as an Information Access ("InA") protocol). InA is a protocol used by SAP® products to retrieve data from (embedded) BW or HANA databases. Functionalities are codes in ABAP classes/methods. Leveraging an InA Provider connection, it is possible to do the following in an Enterprise Performance Management ("EPM") client: work with BW queries (with or without variables); retrieve data, using reports; enter and save data, using input forms; execute planning function for BW integrated planning; etc.

The analytics cloud may appear as simply a cloud service to a user that accesses data. For example, there might be three ways in which this data access could happen:

replicating data from internet-accessible (cloud) sources directly into the analytics cloud;
replicating data from sources within a customer's intranet (on-premise sources) into the analytics cloud via an agent; and
live querying external S/4 HANA, BW or HANA systems via the InA protocol.

Figure 17:
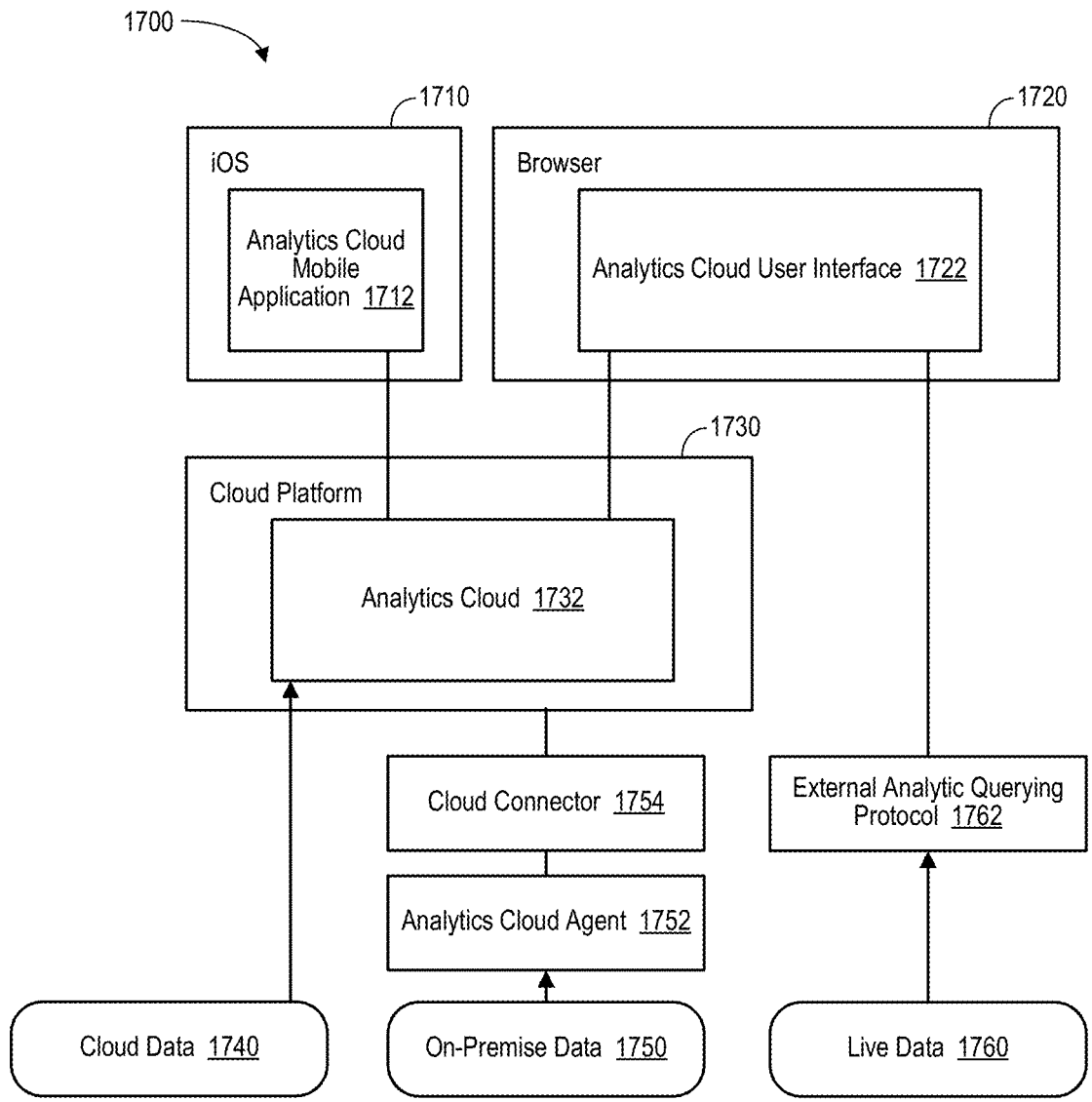
FIG. 17 is an architecture overview in accordance with some embodiments.

FIG. 17 is an architecture overview 1700 in accordance with some embodiments. A mobile OS 1710, such as APPLE® iOS, may execute an analytics cloud mobile application 1712 and a browser 1720 may execute an analytics cloud User Interface ("UP") 1722 (described in more detail in FIG. 18). A cloud platform 1730, such as the SAP® Business Technology Platform ("BTP"), may execute an analytics cloud 1732. The analytics cloud might, according to some embodiments, have three main responsibilities:

hosting the web application UI code to be sent to and executed by the browser 1720;

executing the backend services required to support the clients; and storing the metadata and data that are operated on by the backend services.

Cloud data 1740 might communicate directed with the analytics cloud 1732. On-premise data 1750 may communicate with the analytics cloud 1732 via an analytics cloud agent 1752 and a cloud connector 1754. The analytics cloud agent 1752 may be responsible for data retrieval and may be installed within a customer's intranet (and can be used to access data sources such as SQL databases, ERP systems, BusinessObjects Universes, file servers, etc.). The analytics cloud 1732 may depend on services provided by an SAP® HANA Cloud Platform ("HCP"), including the ability to talk to systems running in a customer's intranet via the cloud connector 1754. The customer is exposed to this and may install and/or configure the cloud connector 1754 in their system. Live data 1760 may communicate with the analytics cloud UI 1722 via an external analytic querying protocol 1762, such as an external InA provider. Allowing access to the live data 1760 sources may require a source capable of providing the InA protocol (e.g., HANA, BW, or S/4 HANA). It may also require a reverse proxy between the browser 1720 and the servers in order to work around a same-domain policy. Cross-Origin Resource Sharing ("CORS") is another alternative (and may be supported by and enabled on the external InA provider).

Figure 18:
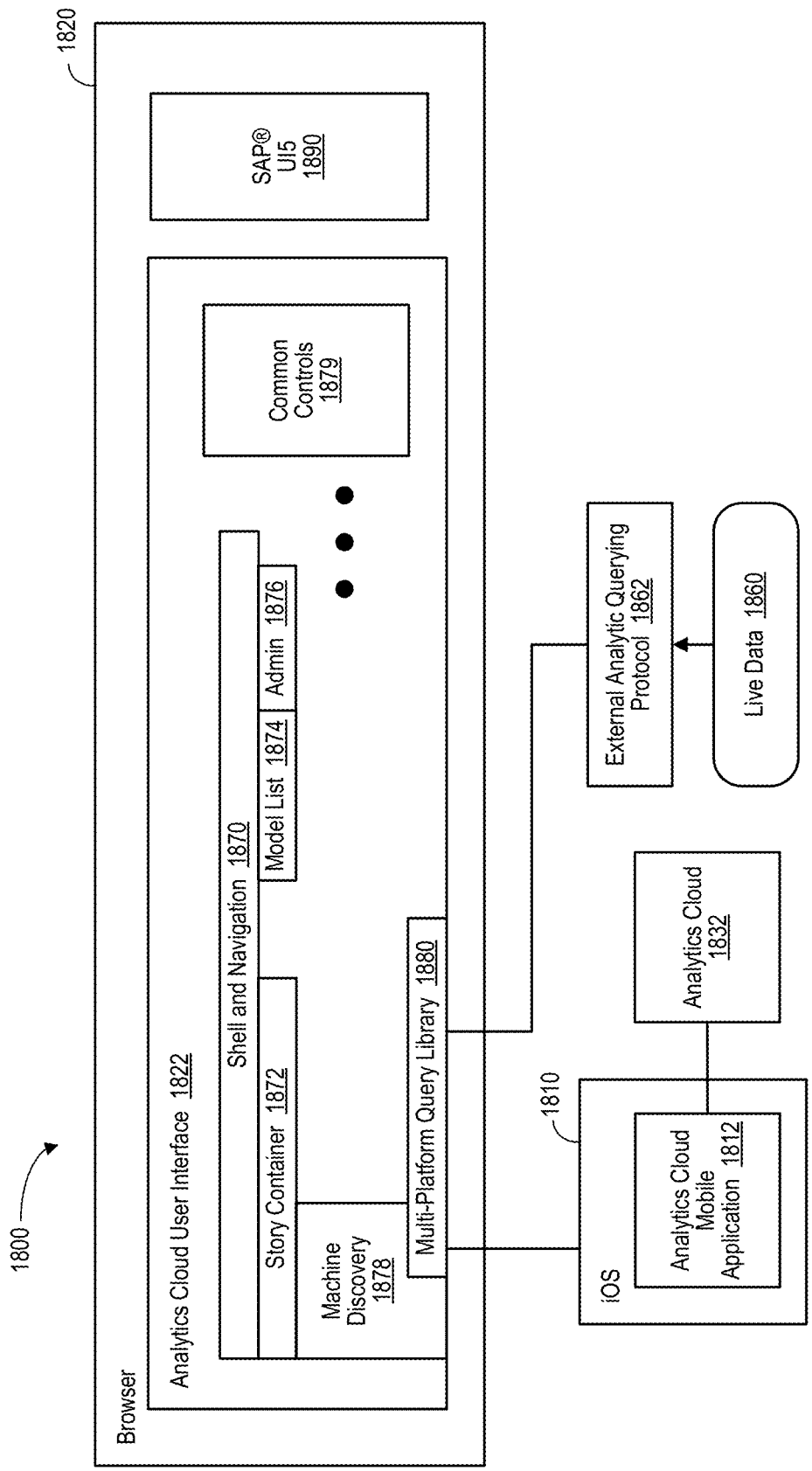
FIG. 18 is a UI architecture overview according to some embodiments.

The SAP® analytics cloud is a rich web application based primarily on SAP® UI5 on the browser 1720 side. For the most part, it is horizontal with many top-level functions that do not depend on each other. FIG. 18 is a UI architecture overview 1800 showing a runtime view of the SAP® analytics cloud UI 1822 after it is loaded into a browser 1820 along with SAP® UI5 1890 according to some embodiments. The analytics cloud UI 1822 may have shell and navigation 1870 control of various views, such as files, events, a value driver tree editor, an allocation manager, etc. The many independent views (the term comes from the SAP UI5 Model-View-Controller framework) each serve up the UI for their specific area. While most of these views are simple enough to be managed by single teams, one (the story container 1872) includes many complex, multi-team, interdependent features including machine discovery 1878, dynamic table control, a report engine, value driver tree, etc. Model list 1874 views might include acquire, wrangle, modeler, etc. and administrator 1876 views might include users, roles, privileges, import/export, etc. The shell and navigation 1870 may provide a header bar and host the different views alone with navigation functionality for selecting/switching between views. The common controls 1879 may help with a unified look and feel. A multi-platform query library 1880 may communicate with an iOS 1810 (running an analytics cloud mobile application 1812 that communicated with an analytics cloud 1832) and live data 1860 (via an external analytic querying protocol 1862 such as InA). For example, the multi-platform query library 1880 might comprise FIREFLY® that provides a unified way to access data. It uses the InA protocol to both query for the data and write back (i.e., planning operations) letting it query from InA providers other than the analytics cloud 1832 itself.

Figure 19:
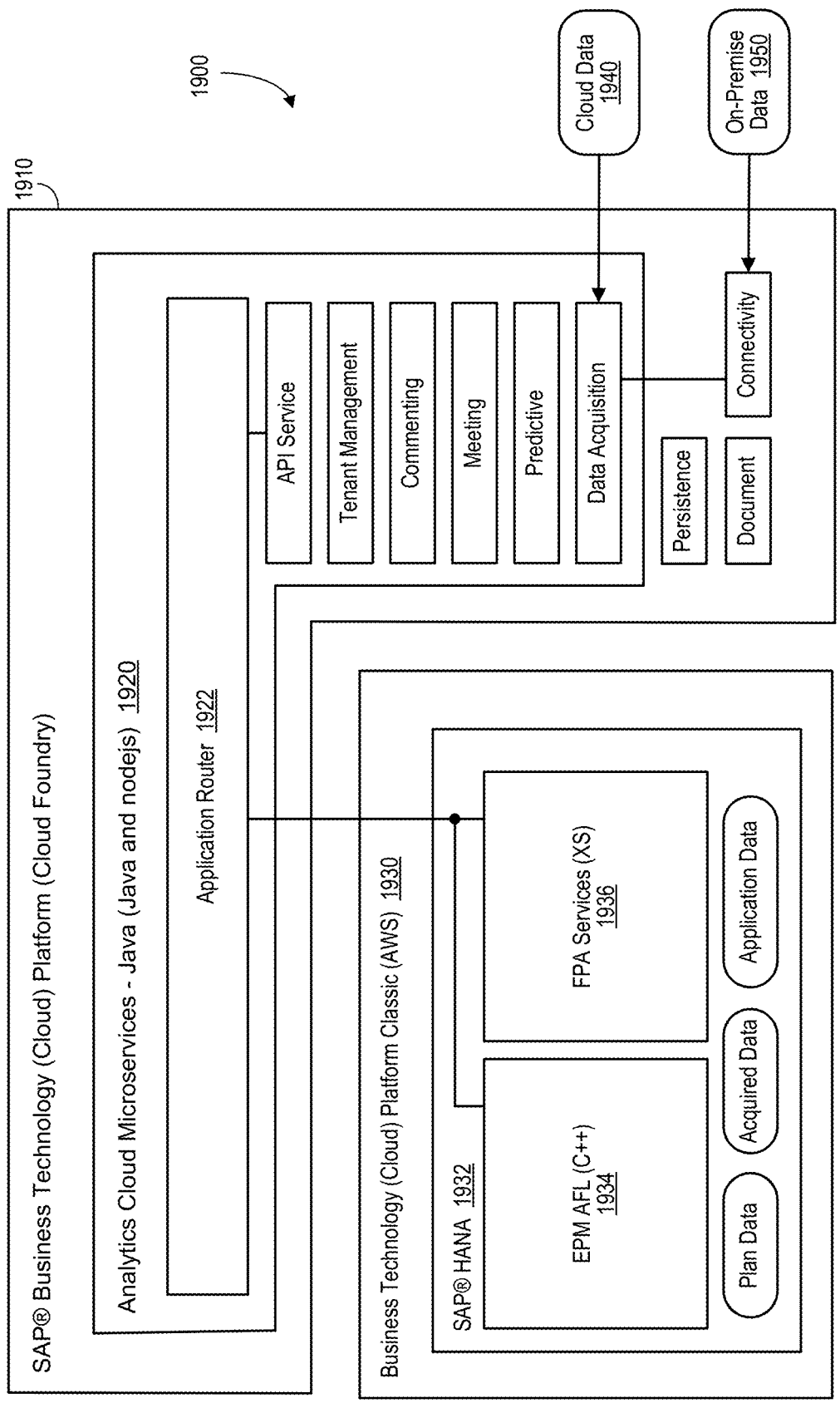
FIG. 19 is a backend architecture overview in accordance with some embodiments.

FIG. 19 is a backend architecture overview 1900 in accordance with some embodiments. An SAP® BTP (Cloud Foundry) 1910 may execute analytics cloud microservices 1920, including an application router 1922, API service, tenant management, commenting, meeting, predictive and data acquisition (to receive cloud data 1940). The application router 1922 is a Java service that acts as the single point of entry to the SAP® analytics cloud backend. It ensures that authentication is done once (via Security Assertion Markup Language ("SAML") and propagates identity to the underlying services, while acting as a reverse proxy to avoid cross-domain issues in the browser. The BTP 1910 may also execute persistence, document, and connectivity (to receive on-premise data 1950). The backend of the SAP® analytics cloud may be deployed within BTP classic 1930 (and alternatively BTP cloud foundry 1910). It might include a HANA XS application 1932 deployed onto many HANA systems that are each shared by a small number of tenants, plus some Java services (or node.js services for cloud foundry that are centrally deployed and shared by all tenants). There are a few major differences between the BTP classic and the BTP cloud foundry deployments, including:

In cloud foundry, HANA is not provided so the SAC team hosts HANA in AWS and provides a HANA Gateway for getting access to HANA.

Node.js services are not available in classic but can be used within cloud foundry.

Propagation of user credentials between services works in a different way (using a JSON Web Token ("JWT") for cloud foundry instead of a mix of SAML plus JWT for classic).

To be shielded from some of the platform differences, implementers of microservices can implement in Java using a service template.

The SAP® HANA 1932 may include Financial Planning and Analysis ("FPA") services 1936 that access acquired data and application data (and represent the bulk of the SAP analytics cloud backend). It might be deployed and executed within HANA as a HANA XS application. Since this includes infrastructure services such as the EPM object manager and ContentLib (the primary metadata services which handles content authorization), most workflows must have at least some interaction with FPA services 1936. The FPA services 1936 might include, for example, predictive, EPM object manager, pusher, events, allocations, modeling, wrangling, users, roles, etc.

SAP® HANA 1932 may also include an EPM Application Function Library ("AFL") 1934 that accesses plan data and acquired data. The AFL is a means within SAP® HANA 1932 to deploy performance-critical code (typically written in C++). The AFL has low-level access to HANA capabilities, including a calculation engine, to help when executing queries or planning operations. Queries are handled by Multi-Dimensional Services ("MDS") while the EPM engine handles planning operations. Handling InA requests in the EPM AFL 1934 involves two pieces—a Deployment Unit ("DU") that deploys the InA service to HANA XS and the underlying implementation in the EPM AFL 1934.

Some services are written in Java for various reasons, including access to open source libraries, centralized deployment, or better platform independence between BTP classic and BTP cloud foundry. They may also have access to SAP® cloud platform's services—including connectivity which is used to access on-premise data via the cloud connector. Due to the centrality of HANA, many requests to Java services may come via FPA services 1936 where authorizations are kept (and may be done via a proxy HANA XS endpoint).

Figure 20:
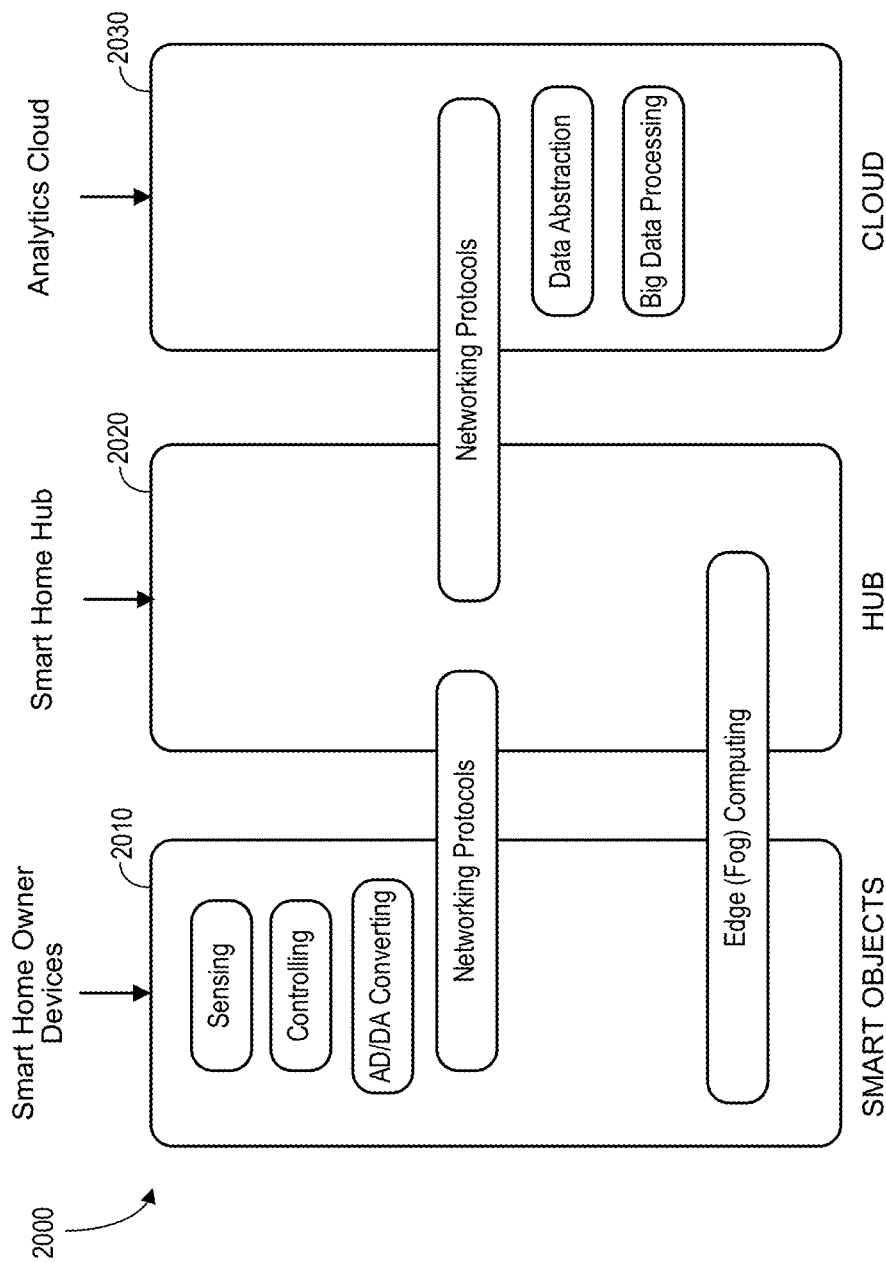
FIG. 20 is a smart home management system according to some embodiments.

Thus, some embodiments may the SAP® Analytics Cloud (SAC) for visualizing, monitoring and analyzing smart home devices. FIG. 20 is a smart home management system 2000 according to some embodiments. The system 2000 includes smart objects 2010 representing the smart devices in the smart home which connect to a smart home hub 2020 (e.g., a door sensor, motion sensor, smart washing machine, or smart meter). The hub 2020 may incorporate cloud 2030 analytics support and act as intermediary between the smart devices and an analytics cloud 2030. The hub 2020 may communicate with the smart objects 2010 via typical networking protocols in the smart home realm (e.g., infrared, Ethernet, WiFi, Bluetooth, Thread, Zigbee, or Z-Wave). The hub 2020 m a software component which can run on common smart home hubs (e.g., a Raspberry® Pi). The main task of the hub 2020 is to collect sensor data from all the smart objects 2010, process, and forward them to the analytics cloud 2030 via the InA protocol.

Figure 21:
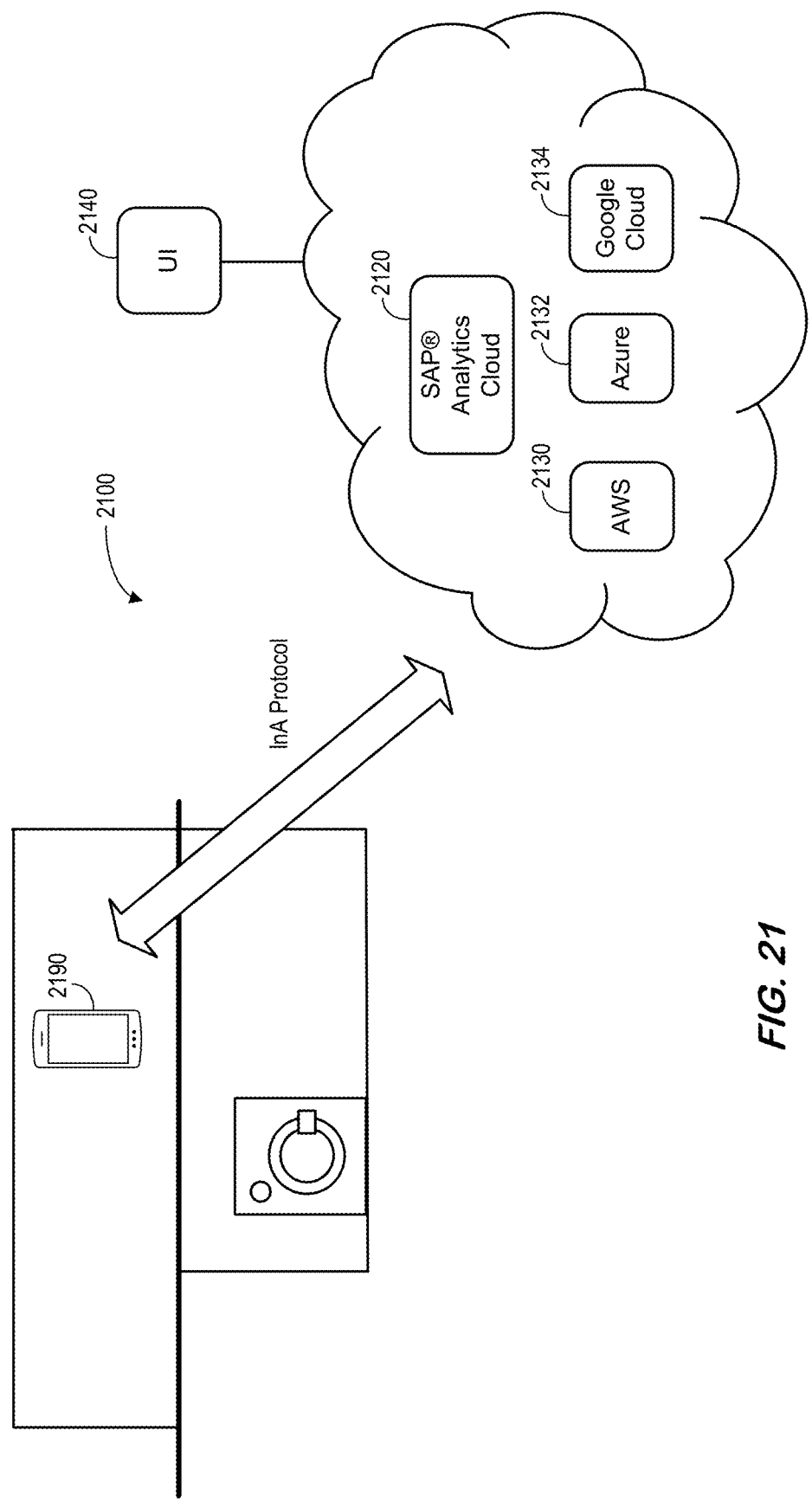
FIG. 21 is a solution overview in accordance with some embodiments.

FIG. 21 is a solution overview 2100 in accordance with some embodiments. Here, a smartphone 2190 acting as the hub transmits sensor information to the SAP® analytics cloud 2120 via the InA protocol. The analytics may then be performed by AWS® 2130, AZURE® 2132, or GOOGLE® cloud 2134 processing. The smart home hub 2190 may collect and process smart home device information according to the preferences of the user. Note, that this functionality does not need a new hardware. Instead, the new "hub" 2190 may comprise a piece of software which can run on any existing smart home hub 2190. As an example, consider a door sensor which continuously delivers the status "open" or "closed" to the hub 2190. The hub 2190 would then need to be configured such that the door sensor's data shall be offered to SAP® analytics cloud 2120.

Figure 22:
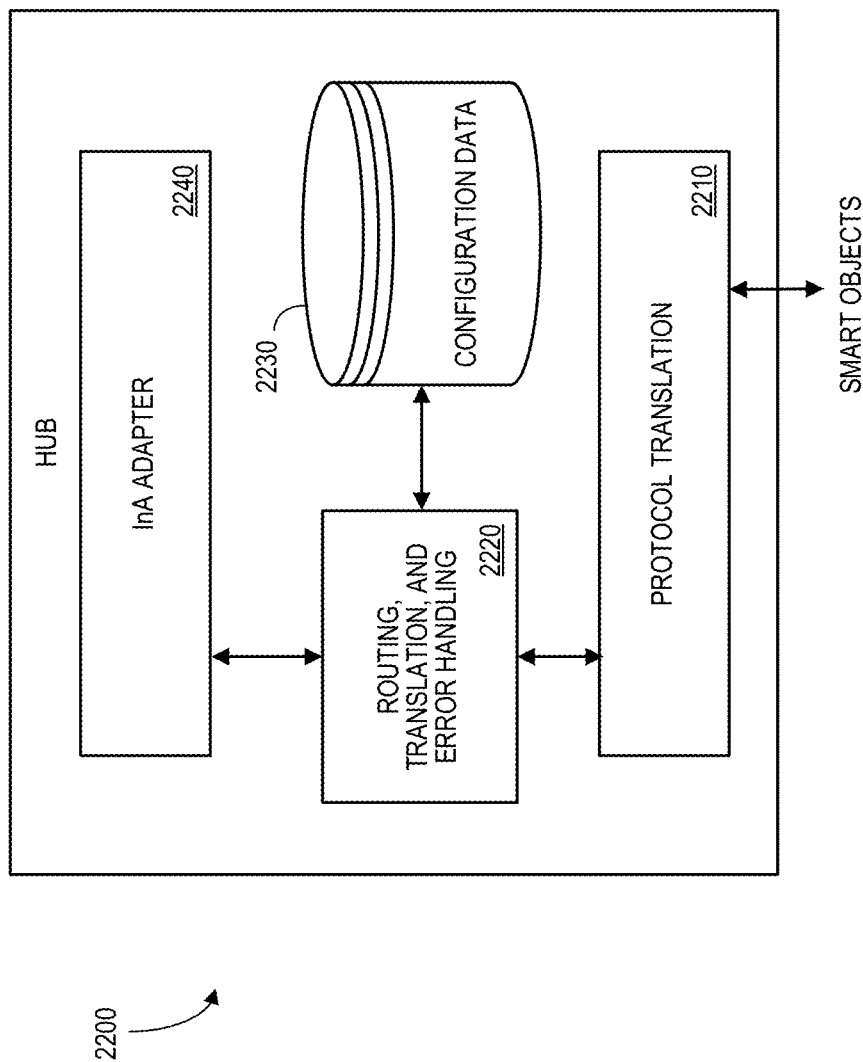
FIG. 22 is a smart home hub according to some embodiments.

FIG. 22 is a smart home hub 2200 according to some embodiments. The hub 2200 includes protocol translation 2210 supporting various communication protocols with smart objects. The hub 2200 may be the central component and act as enabler, intermediary, and router between the smart devices and the analytics cloud. In order to work with any smart device on the market, the protocol translation 2210 may support the common protocols in the realm of IoT. A main task of the hub 2200 is to translate those protocols to the InA protocol using an InA adapter 2240. In some embodiments, the hub 2200 may need to maintain device identifiers and sessions via routing, translation, and error handling 2220 and configuration data 2230 in order to be able to serve incoming InA requests from the analytics cloud.

Figure 23:
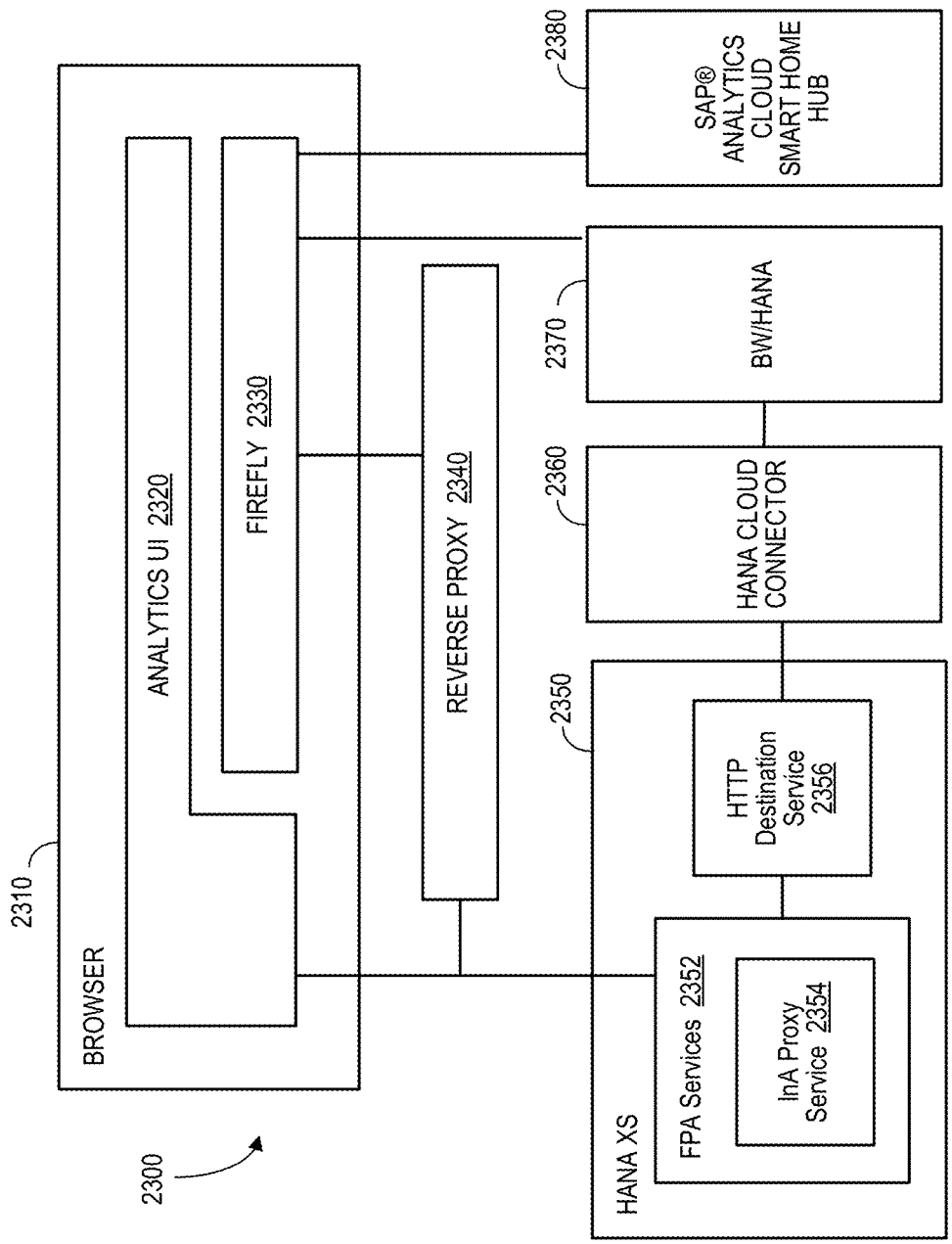
FIG. 23 illustrates analytics cloud and hub interactions in accordance with some embodiments.

FIG. 23 illustrates analytics 2300 cloud and hub interactions in accordance with some embodiments. A browser 2310 may execute an analytics UI 2320 and a FIREFLY 2330 analytic querying protocol. FIREFLY 2330 is a part of the SAC UI and comprises a multi-platform query library that enables interactions with backends that support the InA protocol. FIREFLY 2330 provides a capabilities model that allows the client to inquire about the backend capabilities. It also exposes functionality in as unified a way as possible across the multiple backends. In addition, FIREFLY 2330 manages the query state and enables it to be manipulated and re-executed as it is changed. According to some embodiments, FIREFLY 2330 also communicates with an SAP® analytics cloud smart home hub 2380.

The analytics UI 23320 and FIREFLY 2330 (via a reverse proxy 2340) may communicate with FPA services 2352 in a HANA XS 2350. The FPA services 2352 may have an InA proxy service 2354 and communicate with BW/HANA 2370 via a HANA cloud connector 2360 and an HTTP destination service 2356. InA allows for live querying, from any remote source that supports the InA interface, what is needed for the smart home scenario.

Example Implementations

Figure 24:
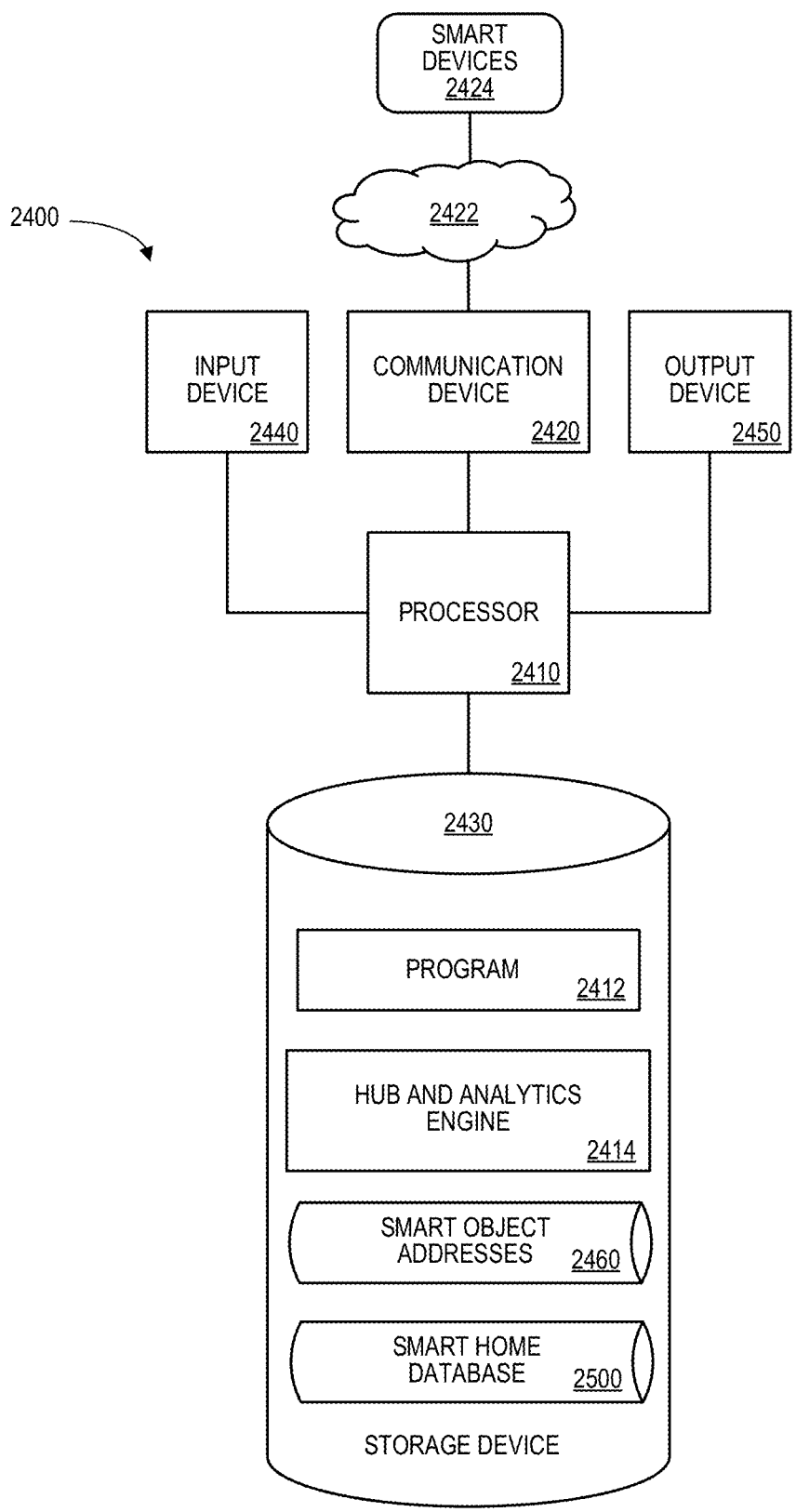
FIG. 24 is an apparatus or platform according to some embodiments.

Note that the embodiments described herein may be implemented using any number of different hardware configurations. For example, FIG. 24 is a block diagram of an apparatus or platform 2400 that may be, for example, associated with the systems 100 and 1100 of FIGS. 1 and 11, respectively (and/or any other system described herein). The platform 2400 comprises a processor 2410, such as one or more commercially available CPUs in the form of one-chip microprocessors, coupled to a communication device 2420 configured to communicate via a communication network (not shown in FIG. 24). The communication device 2420 may be used to communicate, for example, with one or more remote smart devices 2424 via a communication network 2422. The platform 2400 further includes an input device 2440 (e.g., a computer mouse and/or keyboard to input data about smart devices or cloud configuration) and an output device 2450 (e.g., a computer monitor to render a display, transmit views and/or create monitoring reports). According to some embodiments, a mobile device and/or PC may be used to exchange data with the platform 2400.

The processor 2410 also communicates with a storage device 2430. The storage device 2430 can be implemented as a single database, or the different components of the storage device 2430 can be distributed using multiple databases (that is, different deployment data storage options are possible). The storage device 2430 may comprise any appropriate data storage device, including combinations of magnetic storage devices (e.g., a hard disk drive), optical storage devices, mobile telephones, and/or semiconductor memory devices. The storage device 2430 stores a program 2412 and/or a hub and analytics engine 2414 for controlling the processor 2410. The processor 2410 performs instructions of the programs 2412, 2414, and thereby operates in accordance with any of the embodiments described herein. For example, the processor 2410 may facilitate smart home analysis. The processor 2410 may receive sensor information from a plurality of smart home objects (e.g., a washing machine, an electricity meter, etc.). The processor 2410 may also generate smart home events based on the received sensor information. The processor 2410 or another device may be associated with a cloud-native application runtime and/or communicate with a smart home hub. The processor 2410 may receive smart home events from the hub and, responsive to the received events, arrange to execute smart home functions via a cloud infrastructure. For example, a function may arrange to reduce the cost of operating a smart washing machine. As a result of execution of at least one smart home function, the processor 2410 may transmit a smart home response to the hub causing at least one of the smart home objects to perform a task (e.g., the washing machine may automatically run when the cost of electricity is low).

In some embodiments, the processor 2410 may receive sensor information from a plurality of smart home objects. The sensor information may be received via a plurality of different communication protocols. The processor 2410 or another device with built-in smart home support may receive smart home information from the smart home hub via an analytic querying protocol adapted to handle big data. The processor 2410 may process the received smart home information using a multi-platform query library and automatically analyze the processed data using predictive analytics. The processor 2410 may then arrange to display analysis results via an analytics cloud user interface.

The programs 2412, 2414 may be stored in a compressed, uncompiled and/or encrypted format. The programs 2412, 2414 may furthermore include other program elements, such as an operating system, clipboard application, a database management system, and/or device drivers used by the processor 2410 to interface with peripheral devices.

As used herein, data may be "received" by or "transmitted" to, for example: (i) the platform 2400 from another device; or (ii) a software application or module within the platform 2400 from another software application, module, or any other source.

In some embodiments (such as the one shown in FIG. 24), the storage device 2430 further stores smart object address 2460 to facilitate communication with other devices. Moreover, in some embodiments the program 2412 may access smart home database 2500 that contains information about a smart home. An example of a database that may be used in connection with the platform 2400 will now be described in detail with respect to FIG. 25. Note that the database described herein is only one example, and additional and/or different data may be stored therein. Moreover, various databases might be split or combined in accordance with any of the embodiments described herein.

Figure 25:
FIG. 25 illustrates a smart home data store in accordance with some embodiments.

Referring to FIG. 25, a table is shown that represents the smart home database 2500 that may be associated with the platform 2400 according to some embodiments. The table may include, for example, entries identifying smart homes utilizing the advantages of the various embodiments described herein. The table may also define fields 2502, 2504, 2506, 2508 for each of the entries. The fields 2502, 2504, 2506, 2508 may, according to some embodiments, specify a smart home identifier 2502, a hub identifier 2504, events 2506, and cloud analytics 2508. The smart home database 2500 may be created and updated, for example, when a new smart home is added to the system, events are received from a smart home hub, etc.

The smart home identifier 2502 might be a unique alphanumeric label or link that is associated with a home being monitored in accordance with any of the embodiments described herein. The hub identifier 2504 represents a device that collects information from smart objects within the smart home (e.g., through a number of different communication protocols). The collected smart home sensor information may be translated into the events 2506 and/or be provided to the cloud analytics 2508.

Figure 26:
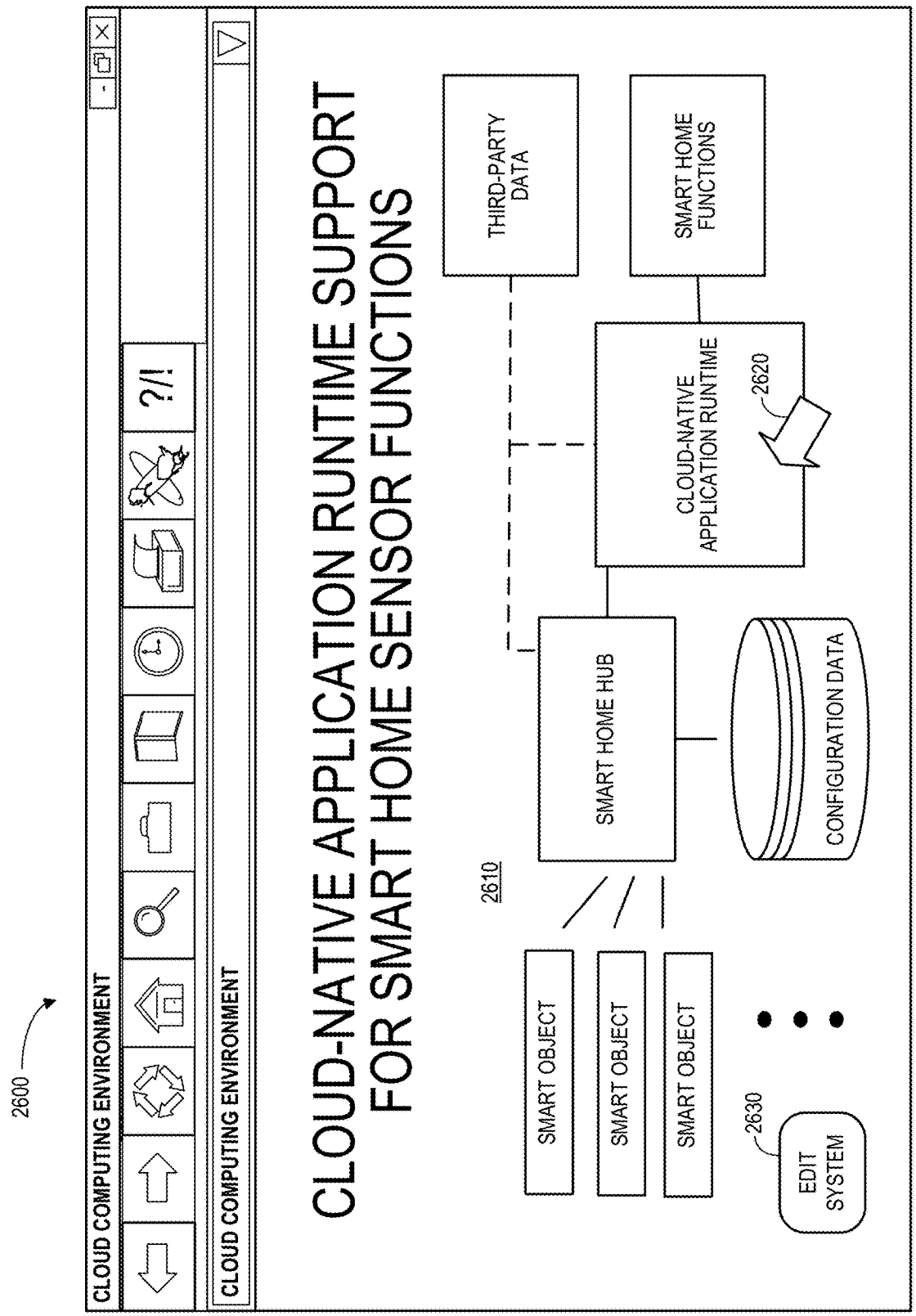
FIG. 26 is a human machine interface display in accordance with some embodiments.

FIG. 26 is a human-machine interface display 2600 in accordance with some embodiments. The display 2600 includes a graphical representation 2610 or dashboard that might be used to manage or monitor a smart home (e.g., in connection with a cloud provider). In particular, selection of an element (e.g., via a touchscreen or computer mouse pointer 2620) might result in the display of a popup window that contains configuration data. The display 2600 may also include a user selectable "Edit System" icon 2630 that a developer may use to request system changes (e.g., to investigate or improve system performance).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 27:
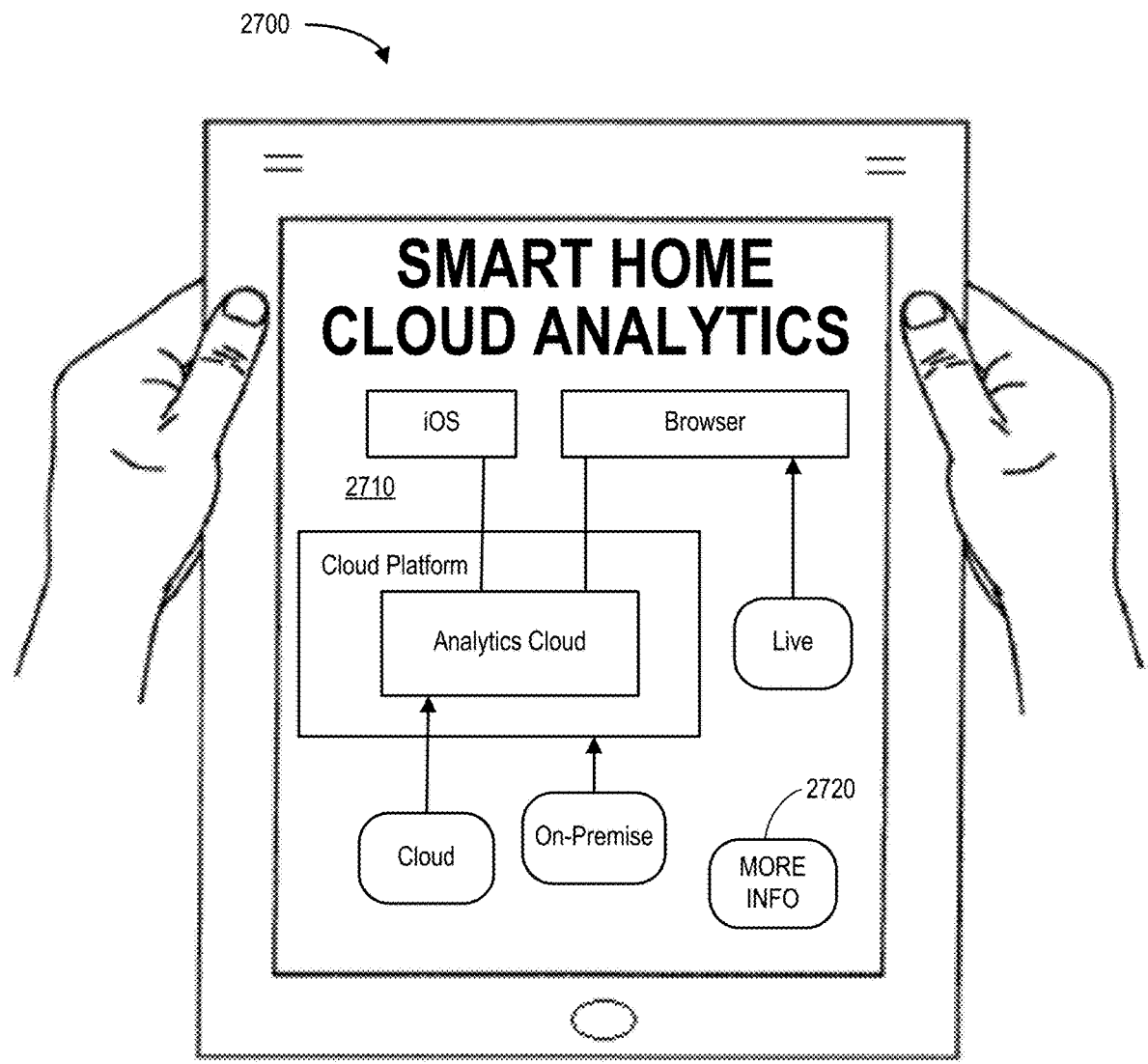
FIG. 27 illustrates a handheld tablet computer according to some embodiments.

Although specific hardware and data configurations have been described herein, note that any number of other configurations may be provided in accordance with some embodiments of the present invention (e.g., some of the data associated with the databases described herein may be combined or stored in external systems). Moreover, although some embodiments are focused on particular types of events and tasks, any of the embodiments described herein could be applied to other types of events or tasks. Moreover, the displays shown herein are provided only as examples, and any other type of user interface could be implemented. For example, FIG. 27 shows a handheld tablet computer 2700 rendering an add event display 2710 that may be used to view or adjust a cloud configuration (e.g., via a "More Info" icon 2720) and/or to request additional data about a smart home setup.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system to facilitate smart home analysis, comprising:
a smart home hub to:
   receive sensor information from a plurality of smart home objects associated with a smart home, wherein the sensor information is received via a plurality of different communication protocols;
   translate the plurality of communication protocols into an analytic querying protocol using an adapter,
   generate and send, based on the received sensor information, smart home events to execute functions in a cloud runtime and receive associated responses from a central management plane,
   perform routing, translation, and error handling via device and session mapping tables to facilitate communication with the plurality of smart home objects; and
an analytics cloud platform with built-in smart home support, in communication with the smart home hub, including:
   a computer processor, and
   a memory storage device, coupled to the computer processor, with instructions that, when executed by the computer processor, enable the system to:
      (i) receive smart home information from the smart home hub via an analytic querying protocol adapted to handle big data,
      (ii) process the received smart home information using a multi-platform query library,
      (iii) automatically analyze the processed data using predictive analytics, and
      (iv) arrange to display analysis results via an analytics cloud user interface that visualizes, on a single display, information about the plurality of smart home objects including at least one graph displaying information about a smart home object over time.

2. The system of claim 1, wherein the plurality of smart home objects include at least one of: (i) a smart home sensor, (ii) an electric vehicle, (iii) an electric vehicle charging station, (iv) an electricity power meter, (v) a local electricity storage unit, (vi) a lighting system, (vii) a Heating, Ventilation, and Air Conditioning ("HVAC") device, (viii) a thermostat, (ix) an occupancy-aware control system, (x) a home robot, (xi) a security system, (x) a camera, (xi) a hazard detection device, (xii) an air quality control device, (xiii) a smart appliance, (xiv) a computer, (xv) a smartphone, and (xvi) a smartwatch.

3. The system of claim 1, wherein the plurality of different communication protocols is associated with at least one of: (i) infrared, (ii) Ethernet, (iii) Wi-Fi, (iv) Bluetooth, (v) Thread, (vi) Zigbee, and (vii) Z-Wave.

4. The system of claim 1, wherein the analytics cloud platform further performs business intelligence, augmented analytics, and enterprise planning.

5. The system of claim 1, wherein data access associated with the analytics cloud platform is performed via at least one of: (i) replicating cloud data via a cloud platform, (ii) replicating on-premise data via a cloud connector and analytics cloud agent, and (iii) live querying an external system via the analytic querying protocol.

6. The system of claim 1, wherein the analytics cloud platform is further to host web application user interface code.

7. The system of claim 6, wherein the analytics cloud platform is further to execute backend services required to support clients.

8. The system of claim 7, wherein the analytics cloud platform is further to store metadata and data that are operated on by the backend services.

9. A computer-implemented method to facilitate smart home analysis, comprising:
   receiving sensor information at a smart home hub from a plurality of smart home objects associated with a smart home, wherein the sensor information is received via a plurality of different communication protocols;
   translating, by the smart home hub, the plurality of communication protocols into an analytic querying protocol using an adapter;
   generating and sending, by the smart home hub based on the received sensor information, smart home events to execute functions in a cloud runtime and receiving associated responses from a central management plane;
   performing routing, translation, and error handling via device and session mapping tables to facilitate communication with the plurality of smart home objects;
   receiving, by a computer processor of an analytics cloud platform, smart home information from the smart home hub via an analytic querying protocol adapted to handle big data;
   processing the received smart home information using a multi-platform query library;
   automatically analyzing the processed data using predictive analytics; and
   arranging to display analysis results via an analytics cloud user interface that visualizes, on a single display, information about the plurality of smart home objects including at least one alert associated with a smart home object.

10. The method of claim 9, wherein the plurality of smart home objects include at least one of: (i) a smart home sensor, (ii) an electric vehicle, (iii) an electric vehicle charging station, (iv) an electricity power meter, (v) a local electricity storage unit, (vi) a lighting system, (vii) a Heating, Ventilation, and Air Conditioning ("HVAC") device, (viii) a thermostat, (ix) an occupancy-aware control system, (x) a home robot, (xi) a security system, (x) a camera, (xi) a hazard detection device, (xii) an air quality control device, (xiii) a smart appliance, (xiv) a computer, (xv) a smartphone, and (xvi) a smartwatch.

11. The method of claim 9, wherein the plurality of different communication protocols is associated with at least one of: (i) infrared, (ii) Ethernet, (iii) Wi-Fi, (iv) Bluetooth, (v) Thread, (vi) Zigbee, and (vii) Z-Wave.

12. The method of claim 9, wherein the analytics cloud platform further performs business intelligence, augmented analytics, and enterprise planning.

13. The method of claim 9, wherein data access associated with the analytics cloud platform is performed via at least one of: (i) replicating cloud data via a cloud platform, (ii) replicating on-premise data via a cloud connector and analytics cloud agent, and (iii) live querying an external system via the analytic querying protocol.

14. The method of claim 9, wherein the analytics cloud platform is further to host web application user interface code.

15. The method of claim 14, wherein the analytics cloud platform is further to execute backend services required to support clients.

16. The method of claim 15, wherein the analytics cloud platform is further to store metadata and data that are operated on by the backend services.

17. A non-transitory, computer readable medium having executable instructions stored therein to perform a method to facilitate smart home analysis, the method comprising:
   receiving sensor information at a smart home hub from a plurality of smart home objects associated with a smart home, wherein the sensor information is received via a plurality of different communication protocols;
   translating, by the smart home hub, the plurality of communication protocols into an analytic querying protocol using an adapter;
   generating and sending, by the smart home hub based on the received sensor information, smart home events to execute functions in a cloud runtime and receiving associated responses from a central management plane;
   performing routing, translation, and error handling via device and session mapping tables to facilitate communication with the plurality of smart home objects;
   receiving, by a computer processor of an analytics cloud platform, smart home information from the smart home hub via an analytic querying protocol adapted to handle big data;
   processing the received smart home information using a multi-platform query library;
   automatically analyzing the processed data using predictive analytics; and
   arranging to display analysis results via an analytics cloud user interface that visualizes, on a single display, information about the plurality of smart home objects including at least one graph displaying information about a smart home object over time and at least one alert associated with a smart home object.

18. The medium of claim 17, wherein the plurality of smart home objects include at least one of: (i) a smart home sensor, (ii) an electric vehicle, (iii) an electric vehicle charging station, (iv) an electricity power meter, (v) a local electricity storage unit, (vi) a lighting system, (vii) a Heating, Ventilation, and Air Conditioning ("HVAC") device, (viii) a thermostat, (ix) an occupancy-aware control system, (x) a home robot, (xi) a security system, (x) a camera, (xi) a hazard detection device, (xii) an air quality control device, (xiii) a smart appliance, (xiv) a computer, (xv) a smartphone, and (xvi) a smartwatch.

19. The medium of claim 17, wherein the plurality of different communication protocols is associated with at least one of: (i) infrared, (ii) Ethernet, (iii) Wi-Fi, (iv) Bluetooth, (v) Thread, (vi) Zigbee, and (vii) Z-Wave.

20. The medium of claim 17, wherein the analytics cloud platform further performs business intelligence, augmented analytics, and enterprise planning.

21. The medium of claim 17, wherein data access associated with the analytics cloud platform is performed via at least one of: (i) replicating cloud data via a cloud platform, (ii) replicating on-premise data via a cloud connector and analytics cloud agent, and (iii) live querying an external system via the analytic querying protocol.

* * * * *